US012490018B2

(12) United States Patent
Zhang et al.

(10) Patent No.: US 12,490,018 B2
(45) Date of Patent: Dec. 2, 2025

(54) ACOUSTIC OUTPUT DEVICES

(71) Applicant: SHENZHEN SHOKZ CO., LTD., Guangdong (CN)

(72) Inventors: Lei Zhang, Shenzhen (CN); Zhen Wang, Shenzhen (CN); Liwei Wang, Shenzhen (CN); Peigeng Tong, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 271 days.

(21) Appl. No.: 18/313,314

(22) Filed: May 5, 2023

(65) Prior Publication Data

US 2023/0319460 A1 Oct. 5, 2023

Related U.S. Application Data

(63) Continuation of application No. PCT/CN2021/095996, filed on May 26, 2021.

(30) Foreign Application Priority Data

Apr. 9, 2021 (CN) ......................... 202110383452.2

(51) Int. Cl.
*H04R 1/28* (2006.01)
*H04R 1/02* (2006.01)
(Continued)

(52) U.S. Cl.
CPC ........... *H04R 1/2811* (2013.01); *H04R 1/023* (2013.01); *H04R 1/1008* (2013.01);
(Continued)

(58) Field of Classification Search
CPC .... H04R 1/2811; H04R 1/023; H04R 1/1008; H04R 1/1075; H04R 1/2826; H04R 1/345;
(Continued)

(56) References Cited

U.S. PATENT DOCUMENTS 10,609,496 B2 3/2020 Liao et al.
2017/0164088 A1 6/2017 Fukuda
(Continued)

FOREIGN PATENT DOCUMENTS

CN 103079151 A 5/2013
CN 103384355 A 11/2013
(Continued)

OTHER PUBLICATIONS

Decision to Grant a Patent in Japanese Application No. 2023-543187 mailed on Dec. 23, 2024, 6 pages.
(Continued)

*Primary Examiner* — Tuan D Nguyen
(74) *Attorney, Agent, or Firm* — METIS IP LLC

(57) ABSTRACT

The present disclosure provides an acoustic output device including a speaker assembly. The speaker assembly may include a transducer, a diaphragm, and a housing. A vibration of the diaphragm driven by the transducer may generate an air conduction sound wave. The housing may form an accommodating chamber for accommodating the transducer and the diaphragm. The diaphragm may separate the accommodating chamber to form a first chamber and a second chamber. A sound outlet communicating with the second chamber is arranged on the housing. The air conduction sound wave is transmitted to the outside of the acoustic output device through the sound outlet. A sound guiding channel communicating with the sound outlet is provided on the housing for guiding the air conduction sound wave to a
(Continued)

target direction outside the acoustic output device. The length of the sound guiding channel may be less than or equal to 7 mm.

18 Claims, 14 Drawing Sheets

(51) Int. Cl.

| | |
|---|---|
| ***H04R 1/10*** | (2006.01) |
| ***H04R 1/34*** | (2006.01) |
| ***H04R 1/40*** | (2006.01) |
| ***H04R 7/12*** | (2006.01) |
| ***H04R 9/02*** | (2006.01) |
| ***H04R 9/04*** | (2006.01) |
| ***H04R 9/06*** | (2006.01) |
| ***H04R 23/02*** | (2006.01) |

(52) U.S. Cl.
CPC ......... *H04R 1/1075* (2013.01); *H04R 1/2826* (2013.01); *H04R 1/345* (2013.01); *H04R 1/406* (2013.01); *H04R 7/12* (2013.01); *H04R 9/025* (2013.01); *H04R 9/045* (2013.01); *H04R 9/06* (2013.01); *H04R 23/02* (2013.01); *H04R 1/1041* (2013.01); *H04R 2460/11* (2013.01); *H04R 2460/13* (2013.01)

(58) Field of Classification Search
CPC .......... H04R 1/406; H04R 7/12; H04R 9/025; H04R 9/045; H04R 9/06; H04R 23/02; H04R 1/1041; H04R 2460/11; H04R 2460/13; H04R 1/2849; H04R 25/606; H04R 31/003; H04R 9/066; H04R 1/1016; H04R 1/1083; H04R 5/0335; H04R 2400/03; H04R 1/10
See application file for complete search history.

(56) References Cited

U.S. PATENT DOCUMENTS

| | | | |
|---|---|---|---|
| 2019/0104352 | A1 | 4/2019 | Ozawa et al. |
| 2020/0045397 | A1 | 2/2020 | Wu et al. |
| 2020/0045398 | A1 | 2/2020 | Wu et al. |
| 2020/0045408 | A1 | 2/2020 | Wu et al. |
| 2020/0336824 | A1 | 10/2020 | Zheng et al. |
| 2021/0014595 | A1 | 1/2021 | Li et al. |
| 2021/0076123 | A1 | 3/2021 | Zhang et al. |

FOREIGN PATENT DOCUMENTS

| | | | |
|---|---|---|---|
| CN | 204993827 | U | 1/2016 |
| CN | 106937222 | A | 7/2017 |
| CN | 106954150 | A | 7/2017 |
| CN | 109511043 | A | 3/2019 |
| CN | 210093483 | U | 2/2020 |
| CN | 111182426 | A | 5/2020 |
| CN | 211831105 | U | 10/2020 |
| CN | 111954142 | A | 11/2020 |
| CN | 112367596 | A | 2/2021 |
| CN | 112437379 | A | 3/2021 |
| CN | 214707999 | U | 11/2021 |
| CN | 214708013 | U | 11/2021 |
| CN | 214708014 | U | 11/2021 |
| CN | 214708017 | U | 11/2021 |
| EP | 3125573 | A1 | 2/2017 |
| TW | 201820891 | A | 6/2018 |
| WO | 2018079340 | A1 | 5/2018 |

OTHER PUBLICATIONS

First Office Action in Chinese Application No. 202110382928.0 mailed on Oct. 15, 2024, 11 pages.

Notice of Preliminary Rejection in Korean Application No. 10-2023-7023332 mailed on Jun. 13, 2024, 10 pages.

First Office Action in Chinese Application No. 202110383452.2 mailed on Apr. 16, 2024, 12 pages.

The Extended European Search Report in European Application No. 21935680.5 mailed on Feb. 23, 2024, 7 pages.

First Office Action in Chinese Application No. 202110382214.X mailed on Apr. 17, 2024, 12 pages.

First Office Action in Chinese Application No. 202110382392.2 mailed on Apr. 15, 2024, 12 pages.

First Office Action in Chinese Application No. 202110382912.X mailed on Apr. 17, 2024, 12 pages.

International Search Report in PCT/CN2021/095996 mailed on Sep. 15, 2021, 7 pages.

Notice of Reasons for Rejection in Japanese Application No. 2023-543187 mailed on Sep. 9, 2024, 11 pages.

200B

200C

ACOUSTIC OUTPUT DEVICES

CROSS-REFERENCE TO RELATED APPLICATION

This application is a continuation of International Patent Application No. PCT/CN2021/095996 filed on May 26, 2021, which claims priority of Chinese Patent Application No. 202110383452.2 filled on Apr. 9, 2021, the contents of each of which are entirely incorporated herein by reference.

TECHNICAL FIELD

The present disclosure relates to the technical field of electronic devices, and in particular to an acoustic output device.

BACKGROUND

With the continuous development of electronic devices, an acoustic output device (e.g., an earphone) has become an indispensable social and entertainment tool in people's daily life, and people's requirement for the acoustic output device is also increasing. However, there are still many problems in the existing acoustic output device, such as complex structure, poor sound quality, serious sound leakage, etc. Therefore, it is desirable to provide an acoustic output device with a simple structure and high acoustic performance to meet the requirements of a user.

SUMMARY

One embodiment of the present disclosure provides an acoustic output device. The acoustic output device may include a speaker assembly. The speaker assembly may include a transducer, a diaphragm, and a housing. The diaphragm may be driven by the transducer to vibrate to generate an air conduction sound wave. The housing may form an accommodating chamber for accommodating the transducer and the diaphragm, and the diaphragm separates the accommodating chamber to form a first chamber and a second chamber, the housing is provided with a sound outlet communicating with the second chamber, and the air conduction sound wave is transmitted to the outside of the acoustic output device through the sound outlet. A sound guiding channel communicating the sound outlet is provided on the housing for guiding the air conduction sound wave to a target direction outside the acoustic output device, and a length of the sound guiding channel is less than or equal to 7 mm.

In some embodiments, the length of the sound guiding channel may be in the range of 2 mm-5 mm.

In some embodiments, a cross-sectional area of the sound guiding channel may be greater than or equal to 4.8 $mm^2$.

In some embodiments, the cross-sectional area of the sound guiding channel increases gradually along a transmission direction of the air conduction sound wave.

In some embodiments, the cross-sectional area of an inlet end of the sound guiding channel is greater than or equal to 10 $mm^2$.

In some embodiments, the cross-sectional area of an outlet end of the sound guiding channel is greater than or equal to 15 $mm^2$.

In some embodiments, a ratio of a volume of the sound guiding channel to the volume of the second chamber is in the range of 0.05-0.9.

In some embodiments, the volume of the second chamber is less than or equal to 400 $mm^3$.

In some embodiments, a channel wall of the sound guiding channel includes a curved surface structure.

In some embodiments, an outlet end cover of the sound guiding channel is provided with an acoustic resistance net, and a porosity of the acoustic resistance net is greater than or equal to 13%.

In some embodiments, the housing includes a skin contact area, and the skin contact area is driven by the transducer to vibrate and generate a bone conduction sound wave.

In some embodiments, the diaphragm is physically connected to at least one of the transducer or the housing, the diaphragm moves relative to the at least one of the transducer or the housing to generate the air conduction acoustic wave.

In some embodiments, the transducer may include a magnetic circuit assembly, a coil, and a coil support. The magnetic circuit assembly may be configured to provide a magnetic field. The coil may be configured to vibrate under an action of the magnetic field in response to a received audio signal. The coil support may be configured to support the coil. At least a part of the coil support is exposed from a side of the housing in a direction perpendicular to a vibration direction of the housing. The acoustic output device may further include a sound conduction component. The sound conduction component may include the sound guiding channel and a depressed region, and when the sound conduction component is physically connected to the housing, the coil support is located in the depressed region.

In some embodiments, one of the housing and the sound conduction component may be provided with an insertion hole. The other of the housing and the sound conduction component may be provided with an insertion post. The insertion post can be inserted and fixed in the insertion hole.

In some embodiments, the air conduction sound wave output through the sound outlet has a first resonance peak. The acoustic output device may further include a Helmholtz resonator. The Helmholtz resonator may include a resonator body and at least one resonator opening configured to weaken the first resonance peak of the air conduction sound wave.

In some embodiments, the at least one resonator opening is provided on a side wall of the second chamber.

In some embodiments, a difference between a peak resonance intensity of the first resonance peak when the at least one resonator is in an open state and the peak resonance intensity of the first resonance peak when the at least one resonator is in a closed state is greater than or equal to 3 dB.

In some embodiments, the Helmholtz resonator may communicate with the first chamber and the second chamber simultaneously. An area of the at least one resonator opening communicating with the first chamber is greater than or equal to an area of the at least one resonator opening communicating with the second chamber.

In some embodiments, an acoustic resistance net is provided at the at least one resonator opening, and the porosity of the acoustic resistance net is greater than or equal to 3%.

In some embodiments, the housing includes a first housing and a second housing. The first housing constitutes at least a part of the first chamber and having a first resonant frequency, the second housing constitutes at least a part of the second chamber and has a second resonant frequency, and the first resonant frequency is lower than the second resonant frequency.

In some embodiments, the second resonant frequency is less than or equal to 2 KHz.

In some embodiments, the second resonant frequency is less than or equal to 1 kHz.

In some embodiments, when a vibration frequency of the first housing is between 20 Hz and 150 Hz, a phase difference between the second housing and the first housing is between $-\pi/3$ and $+\pi/3$. In some embodiments, when the vibration frequency of the first housing is between 2 kHz and 4 kHz, the phase difference between the second housing and the first housing is between $2\pi/3$ and $4\pi/3$.

In some embodiments, when the acoustic output device is in a wearing state, a first area of the skin contact area is in contact with a user's skin so as to be driven by the transducer to vibrate and generate the bone conduction sound wave, and a second area of the skin contact area is not in contact with the user's skin.

In some embodiments, an angle between the second area and the user's skin is in the range of 0°-45°.

In some embodiments, the angle between the second area and the user's skin is in the range of 10°-30°.

In some embodiments, the acoustic output device may further include a support assembly. One end of the support assembly is connected to the housing to support the speaker assembly, and the second area is farther away from the support assembly than the first area.

In some embodiments, the acoustic output device may further include a signal processing circuit. The signal processing circuit may be configured to convert an audio signal into a driving signal of the transducer. The signal processing circuit has a greater signal gain coefficient for a first frequency band than for a second frequency band of the audio signal, and the second frequency band is higher than the first frequency band.

In some embodiments, the first frequency band includes at least 500 Hz, and the second frequency band includes at least 3.5 kHz or 4.5 kHz.

In some embodiments, the air conduction sound wave output through the sound outlet has a first resonance peak, and the peak resonant frequency of the first resonance peak is within the second frequency band, or is higher than the second frequency band.

Additional features will be set forth in part in the following description. For those skilled in the art, through examining the following contents and accompanying drawings, the additional features may be learned through a production or operation of the embodiments. The features of the present disclosure may be realized and obtained by practicing or using various aspects of the methods, means, tools, and combinations set forth in the following detailed examples.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which the same reference numbers represent the same structures, and wherein.

DETAILED DESCRIPTION

Figure 1A:
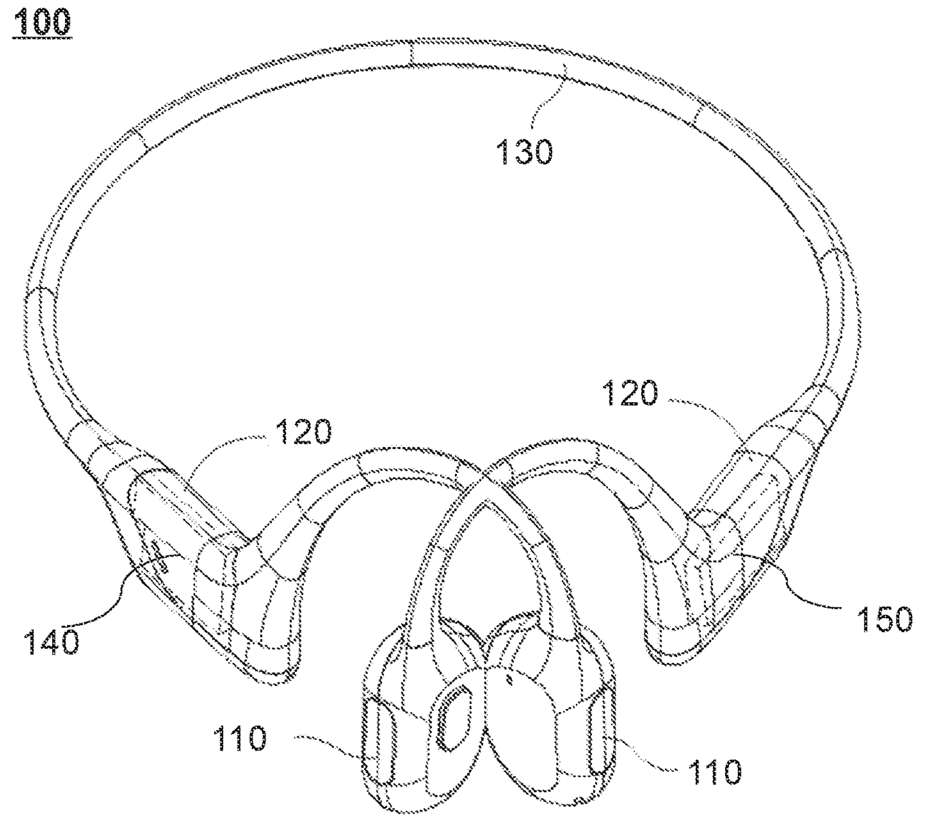
FIG. 1A is a schematic diagram illustrating an exemplary acoustic output device according to some embodiments of the present disclosure.

To illustrate the technical solutions of the embodiments of the present disclosure more clearly, the following briefly introduces the drawings that need to be used in the description of the embodiments. Obviously, the accompanying drawings in the following description are only some examples or embodiments of the present disclosure, and those skilled in the art may further apply the present disclosure to other similar scenarios. Unless otherwise apparent from the context or otherwise indicated, the same numeral in the drawings refers to the same structure or operation.

As used in the present disclosure and the appended claims, the singular forms "a," "an," and "the" include plural referents unless the content clearly dictates otherwise. Generally speaking, the terms "including" and "comprising" only suggest the inclusion of clearly identified operations and elements, and these operations and elements do not constitute an exclusive list, and the method or device may also contain other operations or elements.

It should be understood that the terms "data block," "system," "engine," "unit," "assembly," "module" and/or "block" used herein are used to distinguish different assemblies, elements, assemblies of different levels. However, the words may be replaced by other expressions if other words can achieve the same purpose.

A variety of terms are used to describe the spatial and functional relationships between elements (e.g., between layers), including "connection," "bonding," "interface," and "coupling." Unless expressly described as "directly," when a relationship between a first and second element is described in the present disclosure, the relationship includes a direct relationship in which there are no other intervening elements between the first and second elements, and an indirect relationship (spatial or functional) of one or more intermediate elements exists between a first element and a second element. In contrast, when an element is referred to as being "directly" connected, joined, interfaced, or coupled to another element, there are no intervening elements present. In addition, the spatial and functional relationships between elements may be achieved in various ways. For example, a mechanical connection between two elements may include a welded connection, a keyed connection, a pinned connection, an interference fit connection, etc., or any combination thereof. Other words used to describe the relationship between elements should be interpreted in a similar way (e.g., "between," "between," "adjacent" and "directly adjacent," etc.).

The embodiments of the present disclosure provide an acoustic output device. The acoustic output device may include a speaker assembly. The speaker assembly may include a transducer, a diaphragm, and a housing. The transducer may convert an audio signal into a mechanical vibration signal. The diaphragm may be driven by the transducer to vibrate to generate an air conduction sound wave.

The housing may form an accommodating chamber for accommodating the transducer and the diaphragm. The diaphragm may separate the accommodating chamber to form a first chamber and a second chamber. A sound outlet communicating with the second chamber may be provided on the housing. The air conduction sound wave may be transmitted to an outside of the acoustic output device through the sound outlet. In some embodiments, after the vibration generated by the transducer is transmitted to the housing, the vibration may cause the housing to vibrate more obviously. The vibration of the housing may be further transmitted to a user through an area of the housing that is in contact with the user, thereby forming a bone conduction sound that the user can perceive. At the same time, the air conduction sound wave generated by the diaphragm may be transmitted to the user through the sound outlet, so that the user may hear the air conduction sound. At this time, the acoustic output device may simultaneously generate the bone conduction sound and the air conduction sound transmitted to the user. For convenience, the acoustic output device may be called an air conduction and bone conduction combined acoustic output device. In some alternative embodiments, the transducer may only cause the housing to produce a weak vibration that can hardly be felt by the user. At this time, the acoustic output device may be considered to only generate the air conduction sound transmitted to the user, and for convenience, such acoustic output device may be called an air conduction acoustic output device. In the embodiments of the present disclosure, unless otherwise specified, the structures related to the generated air conduction sound (e.g., the sound outlet, a tuning hole, a pressure relief hole, an acoustic resistance net, etc.) may not only be applied to the above situation where the acoustic output device can simultaneously generate the bone conduction sound and the air conduction sound, but also be applied to the situation where the acoustic output device can only generate the air conduction sound without creative efforts by those skilled in the art.

In some embodiments, a sound guiding channel communicating the sound outlet is also provided on the housing for guiding the air conduction sound wave to a target direction outside the acoustic output device. A length of the sound guiding channel is less than or equal to 7 mm. In some embodiments, more air conduction sound waves may be guided to a human ear by setting the sound guiding channel with an appropriate length, so that the volume heard by the user may be increased. In addition, by setting a parameter of the sound guiding channel (e.g., a cross-sectional area of the sound guiding channel, a shape of the sound guiding channel, etc.), a frequency response of the air conduction sound wave may further be adjusted, thereby adjusting a sound quality of the acoustic output device. In some embodiments, the sound guiding channel may be provided on a sound conduction component. The sound conduction component may further have a depressed region. One side of the housing facing the sound guiding channel may be partially cut off, so that an internal structure of the housing forms a protrude platform. When the sound conduction component is buckled with the housing, the protrude platform may be embedded in the depressed region, which can avoid a local over-thickness of the acoustic output device, and does not hinder the fixing between the sound conduction component and the housing, thereby simplifying the structure of the acoustic output device.

Due to an interaction between the second chamber and the sound outlet and/or the sound guiding channel, the air conduction sound wave generated by the acoustic output device may have a first resonance peak in a relatively high frequency band, resulting in a sharp increase of the air conduction sound output by the acoustic output device and a sound leakage brought by the air conduction sound in a frequency band near a peak frequency of the first resonance peak, so as to make the sound quality heard by the user unbalanced, and increase the sound leakage. In some embodiments, a Helmholtz resonator communicating with the second chamber may be provided in the acoustic output device to absorb the sound in a frequency range near the first resonance peak, so as to improve the sound quality and reduce the sound leakage. In some embodiments, the housing may include a first housing forming the first chamber and a second housing forming the second chamber. By setting a first resonant frequency of the first housing to be higher than a second resonant frequency of the second housing, the acoustic output device may generate a stronger air conduction sound wave in a frequency band lower than the second resonant frequency, and generate almost no air conduction sound wave in a frequency band higher than the second resonant frequency. Therefore, by adjusting the second resonant frequency of the second housing, a specific frequency band of the bone conduction sound wave may be supplemented by the air conduction sound wave.

In some embodiments, when a skin contact area on the housing is driven by the transducer to vibrate and generate a bone conduction sound wave, the skin contact area may be set at an inclination to reduce a degree of fit between the skin contact area and the user's skin and reduce an influence of the skin on the vibration of the speaker assembly, so that the housing may vibrate to generate a greater air conduction sound wave without affecting a transmission efficiency of the bone conduction sound wave. In some embodiments, the skin contact area may be set on a transmission assembly, and the bone conduction sound wave generated by the speaker assembly may be transmitted to the user through the transmission assembly, so as to change a vibration degree of the skin contact area and the degree of fit between the skin contact area and the user's skin.

In some embodiments, the audio signal may be pre-equalized by a signal processing circuit to weaken an intensity of the air conduction sound near the peak frequency of the first resonance peak. For example, a signal gain coefficient for a first frequency band of the audio signal is greater than a signal gain coefficient for a second frequency band, and the second frequency band is higher than the first frequency band.

The peak frequency of the first resonance peak is in or higher than the second frequency band.

Figure 1B:
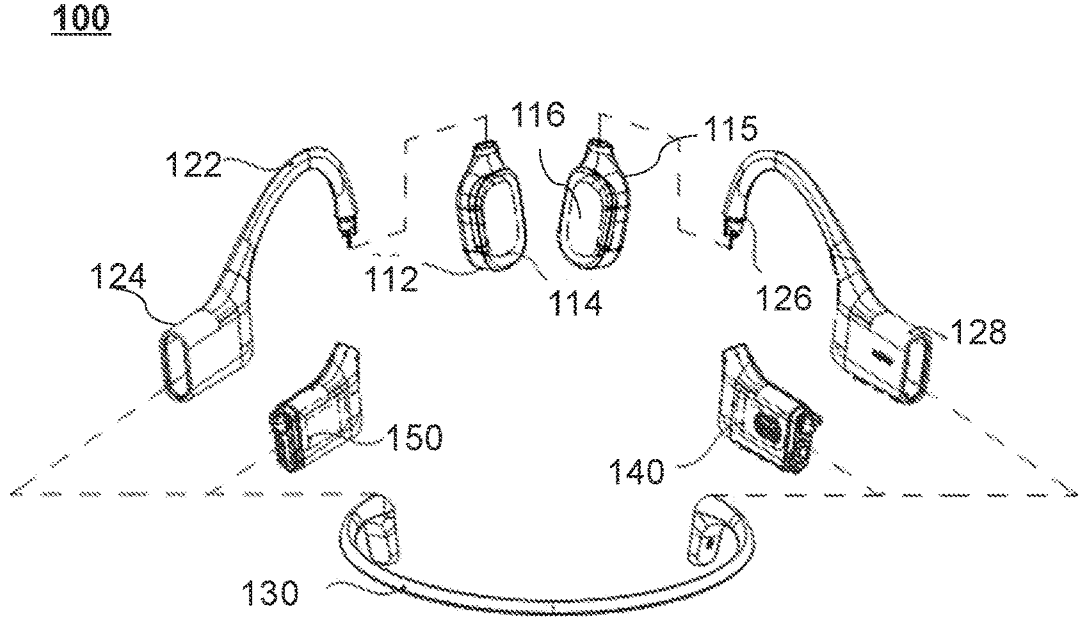
FIG. 1B is an explosion diagram of the acoustic output device in FIG. 1A.

FIG. 1A is a schematic diagram illustrating an exemplary acoustic output device according to some embodiments of the present disclosure. FIG. 1B is an explosion diagram of the acoustic output device in FIG. 1A. An acoustic output device 100 may convert an audio signal (e.g., an electrical signal) into a mechanical vibration signal, and output the signal to the outside in a sound form. In some embodiments, the acoustic output device 100 may include a hearing aid, an earphone, a listening bracelet, smart glasses, a mobile phone, a speaker, and other devices capable of outputting sound. In the embodiment of the present disclosure, the acoustic output device 100 may be illustrated by taking the earphone as an example. As shown in FIGS. 1A and 1B, the acoustic output device 100 may include two speaker assemblies 110, two ear hook assemblies 120, a rear hanging assembly 130, a control circuit assembly 140, and a battery assembly 150. Both ends of the rear hanging assembly 130 may be physically connected to one end of a corresponding ear hook assembly 120, respectively. The other ends of the two ear hook assemblies 120 may be physically connected to the two speaker assemblies 110, respectively. When a user wears the acoustic output device 100, the two speaker assemblies 110 may be located on left and right sides of the user's head, respectively. In some embodiments, the physical connection may include an injection molding connection, a welding, a riveting, a bolting, a bonding, a snapping, etc., or any combination thereof.

As shown in FIG. 1B, the speaker assembly 110 may include a core housing 112 and a core module 114. The core housing 112 may accommodate at least a part of the core module 114. The core module 114 may be configured to convert the audio signal (e.g., the electrical signal) into the mechanical vibration signal, thereby generating sound. In some embodiments, the core module 114 may include a transducer, a diaphragm, etc. The transducer may be configured to generate the mechanical vibration signal in response to the received audio signal. The diaphragm may be driven by the transducer to vibrate to generate a sound wave that is conducted through the air (also known as an air conduction sound wave or an air conduction sound). For example, the diaphragm may be physically connected to the transducer and/or the core housing 112. The diaphragm may move relative to the core housing 112 and/or the transducer, so as to cause the air in the core housing 112 to vibrate. The vibration of the air may act on the user's ear (e.g., an eardrum), thereby being transmitted to an auditory nerve and heard by the user.

In some embodiments, the core housing 112 may include a skin contact area 116. The skin contact area 116 may be in contact with the user's skin. When the acoustic output device 100 is an air conduction and bone conduction combined acoustic output device, the vibration signal generated by the transducer may directly act on bones and/or tissues of the user through the skin contact area 116, thereby being transmitted to the user's auditory nerves through the bones and/or tissues and heard by the user. In the embodiments of the present disclosure, the sound that is heard by the user by transmitting the mechanical vibration signal through the bones and/or tissues may be called a bone conduction sound wave or a bone conduction sound. The skin contact area 116 may further be referred to as a front housing or a first housing of the core housing 112. A surface 115 of the core housing 112 opposite to the front housing 116 may be referred to as a rear housing or a second housing of the core housing 112. In some embodiments, the material and thickness of the skin contact area 116 may affect the transmission of the bone conduction sound wave to the user, thereby affecting the sound quality. For example, if the material of the skin contact area 116 is relatively soft, the transmission of bone conduction sound wave in a low frequency range may be better than the transmission of the bone conduction sound wave in a high frequency range. Conversely, if the material of the skin contact area 116 is relatively hard, the transmission of the bone conduction sound wave in the high frequency range may be better than the transmission of the bone conduction sound wave in the low frequency range. Further descriptions of the speaker assembly may be found elsewhere in the present disclosure (e.g., FIGS. 2A, 4, 6A, 9 and the related descriptions).

It should be noted that, in the embodiments of the present disclosure, the air conduction sound wave and the bone conduction sound wave may represent a voice content contained in the audio signal input into the transducer. The voice content may be represented by frequency components in the air conduction sound wave and the bone conduction sound wave. In some embodiments, the frequency components in the air conduction sound wave and the bone conduction sound wave may be different. For example, the bone conduction sound wave may include more low frequency components, while the air conduction sound wave may include more high frequency components. In the embodiments of the present disclosure, the frequency range corresponding to a low frequency band may include 20 Hz-150 Hz, the frequency range corresponding to a middle frequency band may include 150 Hz-5 kHz, and the frequency range corresponding to a high frequency band may include 5 kHz-20 KHz. The frequency range corresponding to a middle and low frequency band may include 150 Hz-500 Hz, and the frequency range corresponding to a middle and high frequency band may include 500 Hz-5 KHz.

The ear hook assembly 120 may include an ear hook 122 and an accommodating cavity 124. The accommodating cavity 124 may be configured to accommodate one or more components of the acoustic output device 100. For example, the control circuit assembly 140 and/or the battery assembly 150 may be disposed in the accommodating cavity 124. As another example, the acoustic output device 100 may further include a sound pickup assembly, a communication assembly (e.g., a Bluetooth assembly, a near field communication (NFC) assembly) etc. The sound pickup assembly, the communication assembly, etc., may be arranged in the accommodating cavity 124. The sound pickup assembly may be configured to pick up an external sound and convert the external sound into the audio signal, and the communication assembly may be configured to wirelessly connect the acoustic output device 100 to other devices (e.g., a mobile phone, a computer, etc.). In some embodiments, one or more assemblies of the acoustic output device 100 may be disposed in the accommodating cavity of the same ear hook assembly 120. In some embodiments, one or more assemblies of the acoustic output device 100 may be respectively disposed in the accommodating cavities of the two ear hook assemblies 120. For example, the control circuit assembly 140 and the battery assembly 150 may be arranged in the accommodating cavity 124 of the same ear hook assembly 120 or respectively arranged in the accommodating cavities 124 of the two ear hook assemblies 120. In some embodiments, the control circuit assembly 140 and/or the battery assembly 150 may be electrically connected to two core modules 114 through corresponding wires, and the control circuit assembly 140 may be configured to control the core module 114 to convert the electrical signal into the mechanical vibration signal, and the battery assembly 150 may be configured to power the acoustic output device 100. For example, lead wires may be provided in the ear hook 122 to establish electrical connections between the core module 114 and other assemblies (e.g., the control circuit assembly 140, the battery assembly 150, etc.), so as to facilitate the power supply and the data transmission of the core module 114.

In some embodiments, the ear hook 122 may be set in a curved shape, so as to be hung between the user's ear and head, thereby facilitating the realization of the wearing requirements of the acoustic output device 100. Specifically, the ear hook 122 may include an elastic support component (e.g., an elastic metal wire). The elastic support component may be configured to maintain the ear hook 122 in a shape matching the user's ear (e.g., an auricle), and has a certain degree of elasticity, so that a certain degree of elastic deformation is allowed according to the shape of the ear and the shape of the head. When the user wears the acoustic output device 100, the acoustic output device 100 may be adapted to the users with different ear shapes and/or head shapes. In some embodiments, the elastic support component may be made of memory alloy with a good deformation recovery ability. Even if the ear hook 122 is deformed due to an external force, the ear hook 122 may return to its original shape when the external force is removed, thereby prolonging a life of the acoustic output device 100. In some embodiments, the ear hook 122 may also include a protective cover 126 and a housing protector 128 integrally formed with the protective cover 126.

In some embodiments, the rear hanging assembly 130 may be set in a curved shape for wrapping around the back of the user's head. The two speaker assemblies 110 may be closely attached to the user's skin under the cooperation of the two ear hook assemblies 120 and the rear hanging assembly 130, so that the acoustic output device 100 may be worn more stably. In some embodiments, the rear hanging assembly 130 may further include an accommodating chamber. One or more assemblies of the acoustic output device 100 (e.g., the control circuit assembly 140 and/or the battery assembly 150) may be disposed in the accommodating chamber.

It should be noted that the above description of the acoustic output device 100 is intended to illustrate, not limit the scope of the present disclosure. Many alternatives, modifications, and variations may be apparent to those skilled in the art. The features, structures, methods, and other characteristics of the exemplary embodiments described herein may be combined in various ways to obtain additional and/or alternative exemplary embodiments. In some embodiments, the acoustic output device 100 may have other wearing styles. For example, the ear hook assemblies 120 may be configured to cover the user's ears, and the rear hanging assembly 130 may straddle the top of the user's head. As another example, the two speaker assemblies 110 may communicate in a wired or wireless manner. When the two speaker assemblies 110 communicate wirelessly, there may or may not be a physical connection structure between the two speaker assemblies 110. For example, each speaker assembly 110 may be equipped with a separate ear hook structure, and each ear hook structure may independently fix its corresponding speaker assembly 110 near the user's left or right ear, or two ear hook structures may be further fixedly connected together by a connection rod.

Figure 2A:
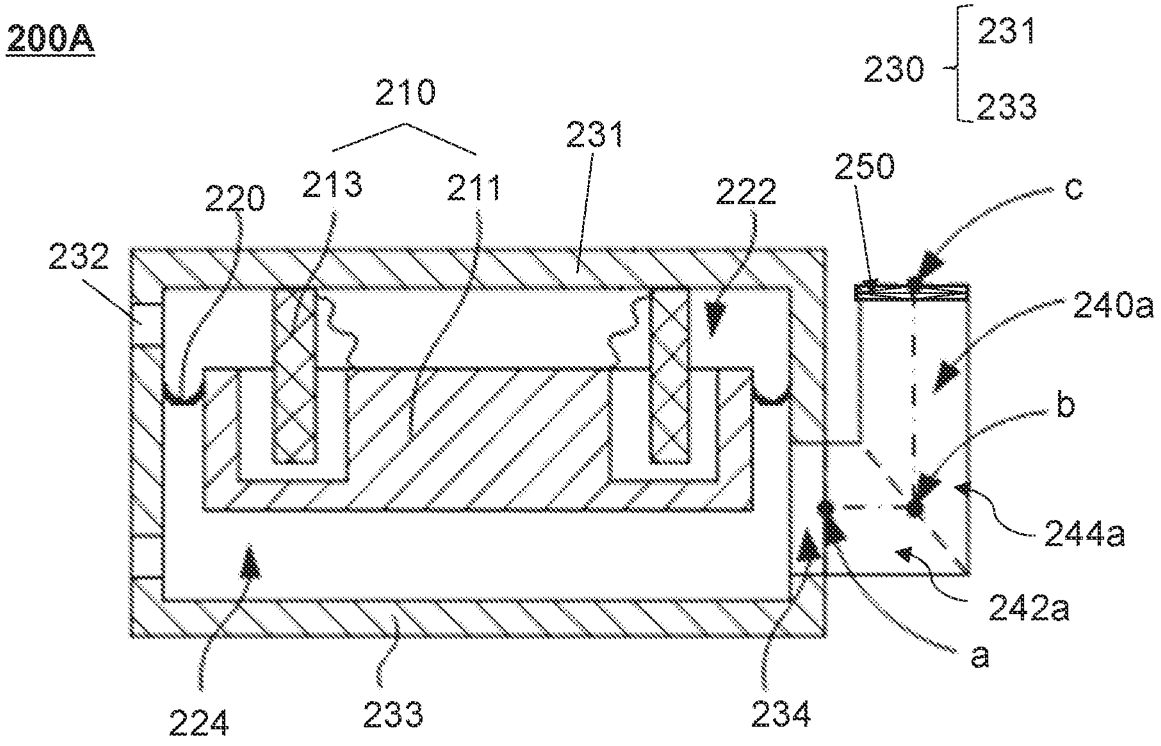
FIGS. 2A to 2E are schematic diagrams illustrating exemplary acoustic output devices according to some embodiments of the present disclosure.

FIGS. 2A to 2E are schematic diagrams illustrating exemplary acoustic output devices according to some embodiments of the present disclosure. As shown in FIG. 2A, an acoustic output device 200A may include a transducer 210, a diaphragm 220, and a housing 230. The housing 230 may form an accommodating chamber for accommodating the transducer 210 and the diaphragm 220. The transducer 210 may be configured to convert a received audio signal (e.g., an electrical signal) into a mechanical vibration signal. For example, the acoustic output device 200A may further include a signal processing circuit (not shown). The transducer 210 may be electrically connected with the signal processing circuit to receive the audio signal, and generate the mechanical vibration signal based on the audio signal. Further descriptions of the signal processing circuit may be found elsewhere in the present disclosure (e.g., FIGS. 15 and 16 and their descriptions). The diaphragm 220 may be driven by the transducer 210 to vibrate and generate an air conduction sound wave. The air conduction sound wave may be transmitted to the user through one or more sound outlets 234 on the housing 230. In some embodiments, the transducer 210 and the diaphragm 220 may further be referred to as a core module. The housing 230 may further be called a core housing. The transducer 210, the diaphragm 220, and the housing 230 may further be referred to as a speaker assembly.

In some embodiments, the transducer 210 may be physically connected to the housing 230. The housing 230 may include a skin contact area 231 (also may be referred to as a first housing). When the user wears the acoustic output device 200A, at least a part of the skin contact area 231 may be in contact with the user's skin, and may be driven by the transducer 210 to vibrate and generate a bone conduction sound wave. In some embodiments, when the user wears the acoustic output device 200A, a first area of the skin contact area 231 may be in contact with the user's skin, and a second area of the skin contact area 231 may not be in contact with the user's skin. In other words, when the user wears the acoustic output device 200A, the skin contact area 231 may be, for example, disposed obliquely. Further description of the skin contact area of the acoustic output device may be found elsewhere in the present disclosure (e.g., FIG. 11 and its descriptions). In some embodiments, the acoustic output device 200A may further include a transmission assembly (not shown). The transmission assembly may be physically connected to the housing 230. The skin contact area may be provided on the transmission assembly. The mechanical vibration signal generated by the transducer 210 may be transmitted to the user through the skin contact area on the transmission assembly to generate the bone conduction sound wave. Further descriptions of the transmission assembly may be found elsewhere in the present disclosure (e.g., FIGS. 12-14 and their descriptions).

In some embodiments, the transducer 210 may be or include any element (e.g., a vibration motor, an electromagnetic vibration device, etc.) that converts the audio signal (e.g., an electrical signal) into the mechanical vibration signal. Exemplary signal conversion ways may include, but are not limited to, an electromagnetic type (e.g., a moving coil type, a moving iron type, a magnetostrictive type), a piezoelectric, an electrostatic, etc. An internal structure of the transducer 210 may be a single resonance system or a composite resonance system. In some embodiments, the transducer 210 may include a magnetic circuit assembly 211 and a coil 213. The magnetic circuit assembly 211 may include one or more magnetic elements and/or magnetic conductive elements, which may be configured to provide a magnetic field. For an air conduction acoustic output device, the coil 213 in the transducer 210 may be directly fixed on the diaphragm 220. The vibration of the transducer 210 may directly drive the vibration of the diaphragm 220 to generate an air conduction sound. For an air conduction and bone conduction combined acoustic output device, the coil 213 may be physically connected to the housing 230. The coil 213 may vibrate under an action of the magnetic field in response to the received audio signal, and drive the housing 230 (e.g., the first housing 231) to vibrate to generate the bone conduction sound wave. The first housing 231 may contact the user's skin (e.g., the skin on the user's head), and transfer the bone conduction sound wave to a cochlea. Specifically, the magnetic circuit assembly 211 may include a magnetic gap. The magnetic circuit assembly 211 may generate the magnetic field in the magnetic gap. The coil 213 may be located in the magnetic gap. When a current (i.e., an audio signal) is passed through the coil 213, the coil 213 may vibrate in the magnetic field and drive the first housing 231 to vibrate. When the user wears the acoustic output device 200A, the vibration of the coil 213 may be transmitted to the bones and/or tissues of the user through the first housing 231, and the vibration may be transmitted to the cochlea of the user through the bones and/or tissues, so that the user may hear the sound (i.e., the bone conduction sound wave). In some embodiments, the transducer 210 may further include a spring plate (not shown). A central area of the spring plate may be connected with the magnetic circuit assembly 211. A peripheral area of the spring plate may be connected with the housing 230 to suspend the magnetic circuit assembly 211 in the housing 230.

In some embodiments, the diaphragm 220 may separate the accommodating chamber formed by the housing 230 to form a first chamber 222 and a second chamber 224. For example, the diaphragm 220 may be connected between the transducer 210 and the housing 230, so as to cooperate with the transducer 210 (e.g., the magnetic circuit assembly 211) to divide the accommodating chamber into the first chamber 222 and the second chamber 224. As another example, the diaphragm 220 may surround a circle along a rear surface of the magnetic circuit assembly 211 and be connected to the housing 230 to separate the accommodating chamber into the first chamber 222 and the second chamber 224. It should be noted that, in the present disclosure, the "front" or "rear" part of a component is defined based on a distance of the part relative to the user's skin when the user wears the acoustic output device 200A. For example, when the user wears the acoustic output device 200A, the first chamber 222 may be closer to the user's skin than the second chamber 224. The first chamber 222 may further be referred to as a front chamber, and the second chamber 224 may further be referred to as a rear chamber.

The diaphragm 220 may generate the air conduction sound wave in the first chamber 222 and/or the second chamber 224 based on the vibration of the transducer 210 and/or the housing 230. Specifically, the diaphragm 220 may be physically connected to the transducer 210 (e.g., the magnetic circuit assembly 211) and/or the housing 230, for example, the diaphragm 220 may be entirely located at a lower side (i.e., the rear side) of the transducer 210 and be wrapped at an area between a bottom wall and a side wall of the transducer 210. When the transducer 210 vibrates, the vibration of the transducer 210 may drive the housing 230 and/or the diaphragm 220 to vibrate. The vibration of the diaphragm 220 may cause the air in the first chamber 222 and/or the second chamber 224 to vibrate. The vibration of air in the first chamber 222 and/or the second chamber 224 may spread to the outside of the acoustic output device 200A through the sound outlet 234 provided on the housing 230 (i.e., generate the air conduction sound wave). In some embodiments, the sound outlet 234 may be configured to communicate the first chamber 222 with the outside. In this case, the transducer 210 and the sound outlet 234 may be located on the same side of the diaphragm 220. The skin contact area 231 may not be in contact with the user's skin. That is, the acoustic output device 200A may only output the air conduction sound wave. In some embodiments, the sound outlet 234 may be configured to communicate the second chamber 224 with the outside. In this case, the transducer 210 and the sound outlet 234 may be located on both sides of the diaphragm 220. It should be known that since a phase of the bone conduction sound wave generated by the transducer 210 is the same as the phase of the air conduction sound wave generated in the second chamber 224, in order to make the acoustic output device 200A have a higher volume, in the present disclosure, setting the sound outlet 234 to communicate with the second chamber 224 is taken as an example, which does not limit the scope of the present disclosure. In some embodiments, when the user wears the acoustic output device 200A, the sound outlet 234 may face an external auditory canal of the user's ear.

In some embodiments, the housing 230 may include a first housing 231 and a second housing 233. The first housing 231 may be buckled with the second housing 233 to constitute the housing 230. The first housing 231 may form at least a part of the side wall of the first chamber 222, and the second housing 233 may form at least a part of the side wall of the second chamber 224, and the first housing 231 and the second housing 233 may be have different resonant frequencies. More descriptions regarding the resonant frequencies of the first housing and the second housing may be found elsewhere in the present disclosure (e.g., FIG. 9 and the related descriptions).

In some embodiments, the housing 230 (e.g., the second housing 233) may drive the air around it to vibrate during the vibration process, so as to generate an air conduction sound wave around the acoustic output device 200A. Since the phase of the air conduction sound wave generated by the vibration of the second housing 233 is opposite to the phase of the air conduction sound wave output by the sound outlet 234, the closer the position of the sound outlet 234 is to the second housing 233, the more the two air conduction sound waves may be canceled. As a result, a volume of the air conduction sound entering the user's ear (i.e., the air conduction sound generated in the second chamber and transferred to the user's ear) may be reduced. In some embodiments, in order to improve the listening volume and the sound quality, the acoustic output device 200A may further include a sound guiding channel (e.g., the sound guiding channel 240*a* shown in FIG. 2A) communicating with the sound output hole 234. The air conduction sound wave passing through the sound outlet 234 may enter the sound guiding channel, and spread through the sound guiding channel from an outlet end of the sound guiding channel in a specific direction. In this way, the sound guiding channel may change the spread direction of the air conduction sound wave, thereby guiding the air conduction sound wave toward a target direction (e.g., the ear) outside the acoustic output device 200A. In addition, by using the sound guiding channel, a distance between the sound outlet end of the acoustic output device 200A (that is, the outlet end of the sound guiding channel) and the user's ear may be shortened and at the same time, a distance between the sound outlet end of the acoustic output device 200A and the second housing 233 may be increased. In other words, the sound guiding channel may make the air conduction sound wave generated in the second chamber 224 (or the rear chamber) output through a sound outlet closer to the ear, thereby allowing more sound to enter the ear.

Figure 2B:
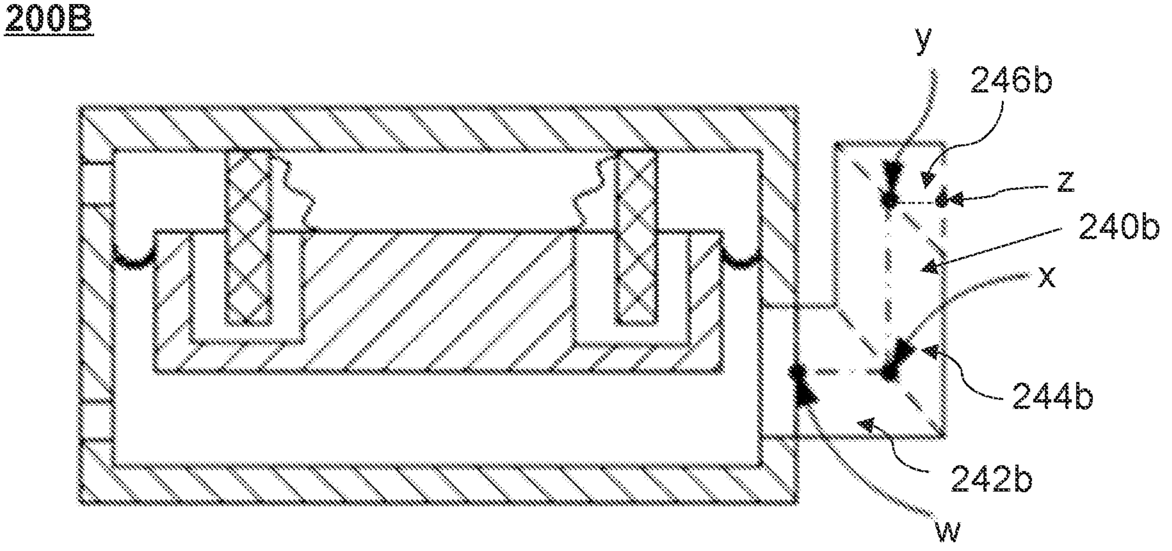
Figure 2C:
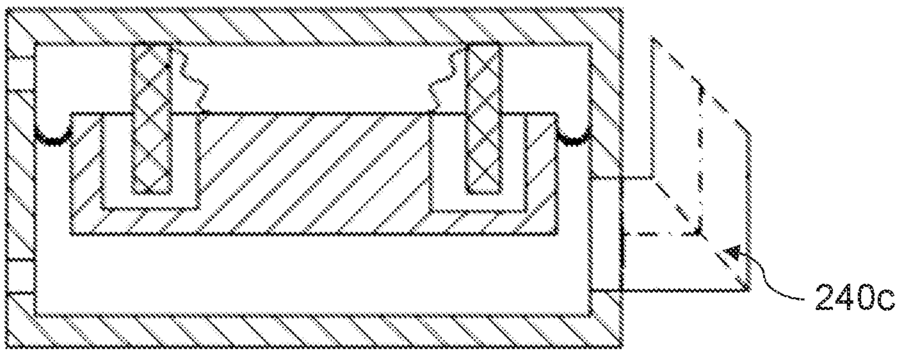

In some embodiments, the outlet end of the sound guiding channel may be configured to point toward various directions. For example, as shown in FIG. 2A, the outlet end of the sound guiding channel 240*a* of the acoustic output device 200A may be set to point toward the user's face. As another example, as shown in FIG. 2B, the outlet end of the sound guiding channel 240*b* of the acoustic output device 200B may be set to point toward the auricle of the user. As another example, as shown in FIG. 2C, the outlet end of the sound guiding channel 240*c* of the acoustic output device 200C may be set to point toward the user's ear canal in an oblique way. By setting the direction of the outlet end of the sound guiding channel, the directivity and/or intensity of the air conduction sound wave may be optimized. In some embodiments, the sound guiding channel may include various shapes. For example, the sound guiding channel may include a bended sound guiding channel. As another example, the sound guiding channel may include a straight-through sound guiding channel. In some embodiments, for a bended sound guiding channel, a whole view of the other end cannot be observed from any one of its inlet and outlet ends, for example, as the sound guiding channel 240*a*, the sound guiding channel 240*b*, and the sound guiding channel 240*c* shown in FIG. 2A, FIG. 2B, or FIG. 2C, respectively. In a straight-through sound guiding channel, the whole view of the other end can be observed from any one of its inlet and outlet ends, for example, the sound guiding channel 240*d* of the acoustic output device 200D and the sound guiding channel 240*e* of the acoustic output device 200E. What needs to be known is that the oblique outlet end can make an actual area of the outlet end of the sound guiding channel not limited by the cross-sectional area of the sound guiding channel, which is equivalent to increasing the cross-sectional area of the sound guiding channel, and helps to output the air conduction sound. In some embodiments, a channel wall of the sound guiding channel may include a curved surface structure (e.g., the sidewall of the sound guiding channel shown in FIG. 2E), so as to facilitate a sound impedance matching between the sound guiding channel and the atmosphere, thereby facilitating the output of the air conduction sound.

In some embodiments, an acoustic structure having the second chamber 224, the sound guiding channel, and the sound outlet 234 may be equivalent to a Helmholtz resonator structure, so the air conduction sound wave output by the acoustic output device 200A may generate a first resonance peak (that is, the resonance peak of the Helmholtz resonator structure) in a certain frequency range. For the Helmholtz resonator structure, its resonant frequency may be determined according to formula (1):

$$f_0 = \frac{1}{2\pi}\sqrt{\frac{S}{V(l+1.7r)}}, \tag{1}$$

where, $f_0$ indicates the resonant frequency of the Helmholtz resonator structure, S indicates the cross-sectional area of the outlet end of the sound guiding channel, V indicates a volume of the second chamber 224, l indicates the length of the sound guiding channel, and r indicates an equivalent radius of the sound guiding channel. Therefore, the sound resonant frequency of the Helmholtz resonator structure (that is, the resonant frequency of the air conduction sound wave output by the acoustic output device 200A) may be adjusted by adjusting parameters such as the volume of the second chamber 224, the cross-sectional area of the outlet end of the sound guiding channel, the length of the sound guiding channel, etc., thus affecting the sound quality of the acoustic output device. For example, the smaller the cross-sectional area of the sound guiding channel, the lower the frequency of the high-frequency resonance peak. The length of the sound guiding channel is shortened, which may increase the frequency of the high-frequency resonance peak. In some embodiments, in order to make the acoustic output device 200A have a better voice output effect, for example, to make the frequency response curve of the acoustic output device 200A be relatively flat in a relatively wide frequency band, the first resonance peak may be located at a position having a frequency as high as possible. In some embodiments, a resonant frequency (also be referred to as a peak resonant frequency) of the peak of the first resonance peak may be greater than or equal to 1 kHz. In some embodiments, the peak resonant frequency of the first resonance peak may be greater than or equal to 1.5 KHz. In some embodiments, the peak resonant frequency of the first resonance peak may be greater than or equal to 2 kHz. In some embodiments, the peak resonant frequency of the first resonance peak may be greater than or equal to 2.5 kHz. In some embodiments, the peak resonant frequency of the first resonance peak may be greater than or equal to 3 kHz. In some embodiments, the peak resonant frequency of the first resonance peak may be greater than or equal to 3.5 kHz. In some embodiments, the peak resonant frequency of the first resonance peak may be greater than or equal to 4 kHz. In some embodiments, the peak resonant frequency of the first resonance peak may be greater than or equal to 4.5 kHz.

In some embodiments, the sound guiding channel may have a uniform cross-sectional area. In order to ensure that the volume of the sound outlet is large enough, the cross-sectional area of the sound guiding channel may be greater than or equal to 4 $mm^2$. In some embodiments, the cross-sectional area of the sound guiding channel may be greater than or equal to 4.8 $mm^2$. In some embodiments, the cross-sectional area of the sound guiding channel may be greater than or equal to 6 $mm^2$. In some embodiments, the cross-sectional area of the sound guiding channel may be greater than or equal to 8 $mm^2$. In some embodiments, the cross-sectional area of the sound guiding channel may be greater than or equal to 10 $mm^2$. In some embodiments, the cross-sectional area of the sound guiding channel may be greater than or equal to 12 $mm^2$. In some embodiments, the cross-sectional area of the sound guiding channel may be greater than or equal to 15 $mm^2$. In some embodiments, the cross-sectional area of the sound guiding channel may be greater than or equal to 20 $mm^2$. In some embodiments, the cross-sectional area of the sound guiding channel may be greater than or equal to 25 $mm^2$.

In some embodiments, the cross-sectional area of the sound outlet hole 234 may gradually decrease along a transmission direction of the air conduction sound wave. The cross-sectional area of the sound guiding channel may gradually increase along the transmission direction of the air conduction sound wave, so that the sound guiding channel is trumpet-shaped (as shown by the sound guiding channel 240*d* in FIG. 2D). In some embodiments, the cross-sectional area of the inlet end of the sound guiding channel may be greater than or equal to 10 $mm^2$. In some embodiments, the cross-sectional area of the inlet end of the sound guiding channel may be greater than or equal to 12 $mm^2$. In some embodiments, the cross-sectional area of the inlet end of the sound guiding channel may be greater than or equal to 15 $mm^2$. In some embodiments, the cross-sectional area of the inlet end of the sound guiding channel may be greater than or equal to 20 $mm^2$. In some embodiments, the cross-sectional area of the inlet end of the sound guiding channel may be greater than or equal to 30 $mm^2$. In some embodiments, the cross-sectional area of the inlet end of the sound guiding channel may be greater than or equal to 50 $mm^2$. In some embodiments, the cross-sectional area of the outlet end of the sound guiding channel may be greater than or equal to 15 $mm^2$. In some embodiments, the cross-sectional area of the outlet end of the sound guiding channel may be greater than or equal to 20 $mm^2$. In some embodiments, the cross-sectional area of the outlet end of the sound guiding channel may be greater than or equal to 25 $mm^2$. In some embodiments, the cross-sectional area of the outlet end of the sound guiding channel may be greater than or equal to 30 $mm^2$. In some embodiments, the cross-sectional area of the outlet end of the sound guiding channel may be greater than or equal to 35 $mm^2$. In some embodiments, the cross-sectional area of the outlet end of the sound guiding channel may be greater than or equal to 40 $mm^2$.

Figure 2D:
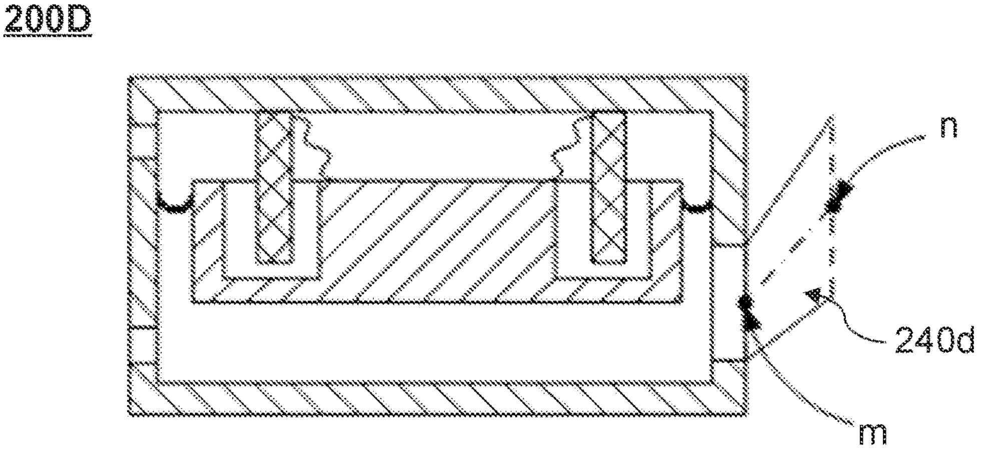
Figure 2E:
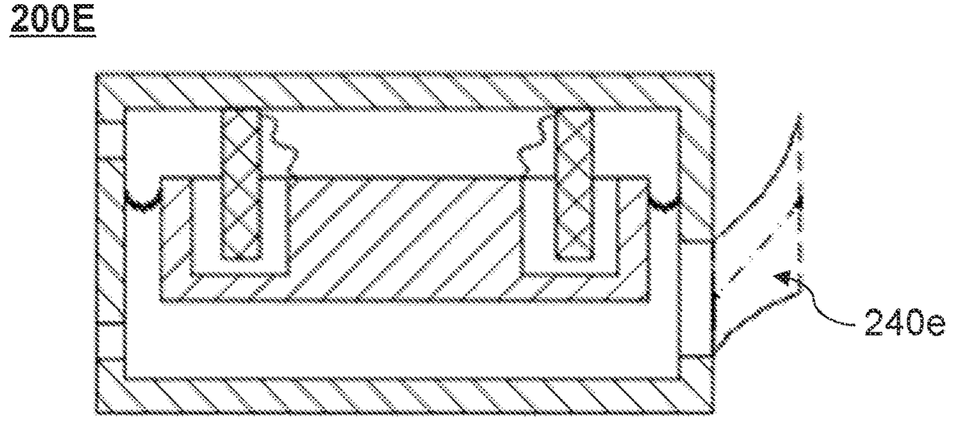

In some embodiments, the length of the sound guiding channel may be less than or equal to 7 mm. In some embodiments, the length of the sound guiding channel may be less than or equal to 6 mm. In some embodiments, the length of the sound guiding channel may be less than or equal to 5 mm. In some embodiments, the length of the sound guiding channel may be less than or equal to 4 mm. In some embodiments, the length of the sound guiding channel may be less than or equal to 3 mm. In some embodiments, the length of the sound guiding channel may be less than or equal to 2 mm. In some embodiments, the length of the sound guiding channel may be less than or equal to 1 mm. In some embodiments, the length of the sound guiding channel may be in a range of 1 mm-5 mm. In some embodiments, the length of the sound guiding channel may be in a range of 1.5 mm-4 mm. In some embodiments, the length of the sound guiding channel may be in a range of 2 mm-3.5 mm. In some embodiments, the length of the sound guiding channel may be 2.5 mm. In some embodiments, for a straight-through sound guiding channel, the length of the sound guiding channel may refer to a distance between geometric centers of its inlet end and outlet end. For example, as shown in FIG. 2D, the geometric center of the inlet end of the sound guiding channel 240*d* is point m, and the geometric center of the outlet end of the sound guiding channel 240*d* is point n, then the length of the sound guiding channel 240*d* may be expressed as the distance between point m and point n. In some embodiments, for the bended sound guiding channel, the bended sound guiding channel may be divided into two or more straight-through sound guiding sub-channels, and a sum of the lengths of the straight-through sound guiding sub-channels may be taken as the length of the bended sound guiding channel. For example, as shown in FIG. 2A, the bended sound guiding channel 240*a* may be divided into a first straight-through sound guiding sub-channel 242*a* and a second straight-through sound guiding sub-channel 244*a*. The geometric center of the inlet end of the first straight-through sound guiding sub-channel 242*a* (or the sound guiding channel 240*a*) is point a, and the geometric center of the outlet end of the first straight-through sound guiding sub-channel 242*a* (or the inlet end of the second straight-through sound guiding sub-channel 244*a*) is point b. The geometric center of the outlet end of the second straight-through sound guiding sub-channel 244*a* (or the sound guiding channel 240*a*) is point c, then the length of the sound guiding channel 240*a* may be expressed as the sum of the distance between point a and point b and the distance between point b and point c. As another example, as shown in FIG. 2B, the bended sound guiding channel 240*b* may be divided into a first straight-through sound guiding sub-channel 242*b*, a second straight-through sound guiding sub-channel 244*b*, and a third straight-through sound guiding sub-channel 246*b*. The geometric center of the inlet end of the first straight-through sound guiding sub-channel 242*b* (or the sound guiding channel 240*b*) is point w, and the geometric center of the outlet end of the first straight-through sound guiding sub-channel 242*b* (or the inlet end of the second straight-through sound guiding sub-channel 244*b*) is point x. The geometric center of the outlet end of the second straight-through sound guiding sub-channel 244*b* (or the inlet end of the third straight-through sound guiding sub-channel 246*b*) is point y. The geometric center of the outlet end of the third straight-through sound guiding sub-channel 246*b* (or the sound guiding channel 240*b*) is point z, then the length of the sound guiding channel 240*b* may be expressed as a sum of the distance between the point w and the point x, the distance between the point x and the point y, and the distance between the point y and the point Z.

In some embodiments, the volume of the second chamber 224 may be no greater than 400 $mm^3$. In some embodiments, the volume of the second chamber 224 may be in a range of 200 $mm^3$-400 $mm^3$. In some embodiments, the volume of the second chamber 224 may be in the range of 250 $mm^3$-380 $mm^3$. In some embodiments, the volume of the second chamber 224 may be in the range of 300 $mm^3$-360 $mm^3$. In some embodiments, the volume of the second chamber 224 may be in the range of 320 $mm^3$-355 $mm^3$. In some embodiments, the volume of the second chamber 224 may be in the range of 340 $mm^3$-350 $mm^3$. In some embodiments, the volume of the second chamber 224 may be 350 $mm^3$. In some embodiments, a ratio of the volume of the sound guiding channel to the volume of the second chamber 224 may be in a range of 0.05-0.9. In some embodiments, the ratio of the volume of the sound guiding channel to the volume of the second chamber 224 may be in the range of 0.1-0.8. In some embodiments, the ratio of the volume of the sound guiding channel to the volume of the second chamber 224 may be in the range of 0.2-0.7. In some embodiments, the ratio of the volume of the sound guiding channel to the volume of the second chamber 224 may be in the range of 0.3-0.6. In some embodiments, the ratio of the volume of the sound guiding channel to the volume of the second chamber 224 may be in the range of 0.4-0.5. In some embodiments, the ratio of the volume of the sound guiding channel to the volume of the second chamber 224 may be 0.45.

In some embodiments, the outlet end of the sound guiding channel 240*a* may be covered with a first acoustic resistance net 250. The first acoustic resistance net 250 may be configured to adjust the air conduction sound output to the outside of the acoustic output device 200A through the sound outlet 234, so as to weaken a peak value of a resonance peak at a middle-high frequency band or a high frequency band of the air conduction sound generated in the second chamber 224. As a result, a frequency response curve of the air conduction sound of the acoustic output device 200A may be flatter, and the listening effect may be better. In addition, the first acoustic resistance net 250 may further isolate the second chamber 224 from the outside to a certain extent, so as to increase the waterproof and dustproof performance of the acoustic output device 200A.

Figure 3:
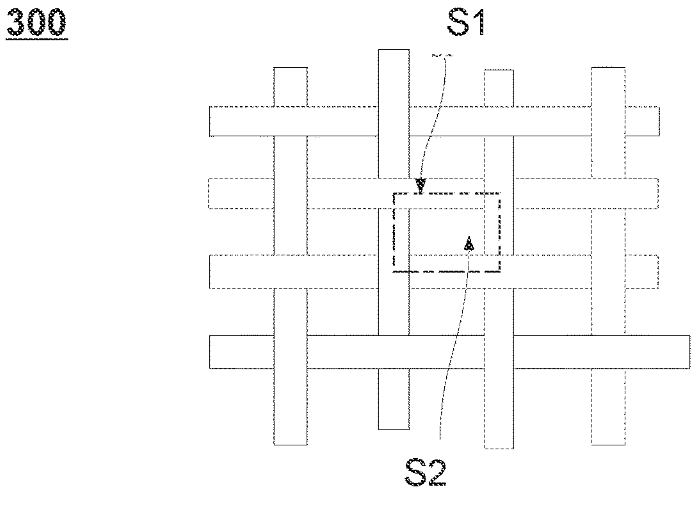
FIG. 3 is a schematic diagram illustrating an exemplary acoustic resistance net according to some embodiments of the present disclosure.

In the present disclosure, the acoustic resistance net may be woven from gauze wires. Factors such as a wire diameter and a density of the gauze wires may affect an acoustic resistance of the acoustic resistance net. Every four intersecting gauze wires among the plurality of gauze wires arranged at intervals longitudinally and horizontally may enclose and form a hole (as shown in FIG. 3). FIG. 3 is a schematic diagram illustrating an exemplary acoustic resistance net according to some embodiments of the present disclosure. An area of a region surrounded by center lines of the gauze wires of an acoustic resistance net 300 may be defined as S1, and an area of a region (that is, a pore) actually surrounded by edges of the gauze wires may be defined as S2; then a porosity may be defined as S2/S1. A pore size may be expressed as a distance between any two adjacent gauze wires with the same arrangement direction, that is, a side length of the pore. In some embodiments, the acoustic resistance of the first acoustic resistance net 250 may be less than or equal to 300 MKSrayls. In some embodiments, the acoustic resistance of the first acoustic resistance net 250 may be less than or equal to 280 MKSrayls. In some embodiments, the acoustic resistance of the first acoustic resistance net 250 may be less than or equal to 260 MKSrayls. In some embodiments, the acoustic resistance of the first acoustic resistance net 250 may be less than or equal to 240 MKSrayls. In some embodiments, the acoustic resistance of the first acoustic resistance net 250 may be less than or equal to 200 MKSrayls. In some embodiments, the acoustic resistance of the first acoustic resistance net 250 may be less than or equal to 150 MKSrayls. In some embodiments, the acoustic resistance of the first acoustic resistance net 250 may be less than or equal to 100 MKSrayls. In some embodiments, the porosity of the first acoustic resistance net 250 may be greater than or equal to 10%. In some embodiments, the porosity of the first acoustic resistance net 250 may be greater than or equal to 13%. In some embodiments, the porosity of the first acoustic resistance net 250 may be greater than or equal to 15%. In some embodiments, the porosity of the first acoustic resistance net 250 may be greater than or equal to 20%. In some embodiments, the porosity of the first acoustic resistance net 250 may be greater than or equal to 25%. In some embodiments, the porosity of the first acoustic resistance net 250 may be greater than or equal to 30%. In some embodiments, the pore size of the first acoustic resistance net 250 may be greater than or equal to 15 μm. In some embodiments, the pore size of the first acoustic resistance net 250 may be greater than or equal to 18 μm. In some embodiments, the pore size of the first acoustic resistance net 250 may be greater than or equal to 20 μm. In some embodiments, the pore size of the first acoustic resistance net 250 may be greater than or equal to 25 μm. In some embodiments, the pore size of the first acoustic resistance net 250 may be greater than or equal to 30 μm. In some embodiments, the pore size of the first acoustic resistance net 250 may be greater than or equal to 35 μm.

In some embodiments, the transducer 210 may further include a coil support. The coil 213 may be disposed on the coil support. At least a part of the coil support may be exposed laterally from the housing 230 in a direction perpendicular to the vibration direction of the housing. In this case, the acoustic output device 200A may further include a sound conduction component. The sound conduction component may be provided with a sound guiding channel and a depressed region. The coil support may be located in the depressed region when the sound conduction component is physically connected to the housing. More descriptions about the sound conduction component may be found elsewhere in the present disclosure (e.g., FIGS. 4 and 5 and their descriptions).

It should be noted that the above description of the acoustic output device is intended to illustrate, and not limit the scope of the present disclosure. Many alternatives, modifications and variations will be apparent to those skilled in the art. The features, structures, methods, and other characteristics of the exemplary embodiments described herein may be combined in various ways to obtain additional and/or alternative embodiments. For example, the count, size, shape, and/or position of one or more acoustic structures (e.g., the sound outlets, the sound guiding channels, the speaker assemblies, etc.) exemplified above may be set according to actual needs. As another example, the housing 230 (e.g., the first housing 231) may be provided with a pressure relief hole 232 communicating with the first chamber 222 to facilitate a pressure balance between the first chamber 222 of the housing 230 and the outside. As another example, the first chamber 222 and the second chamber 224 may not be in a fluid communication. In some embodiments, the first chamber 222 and the second chamber 224 may be in the fluid communication. For example, one or more holes may be disposed on the diaphragm 220.

Figure 4:
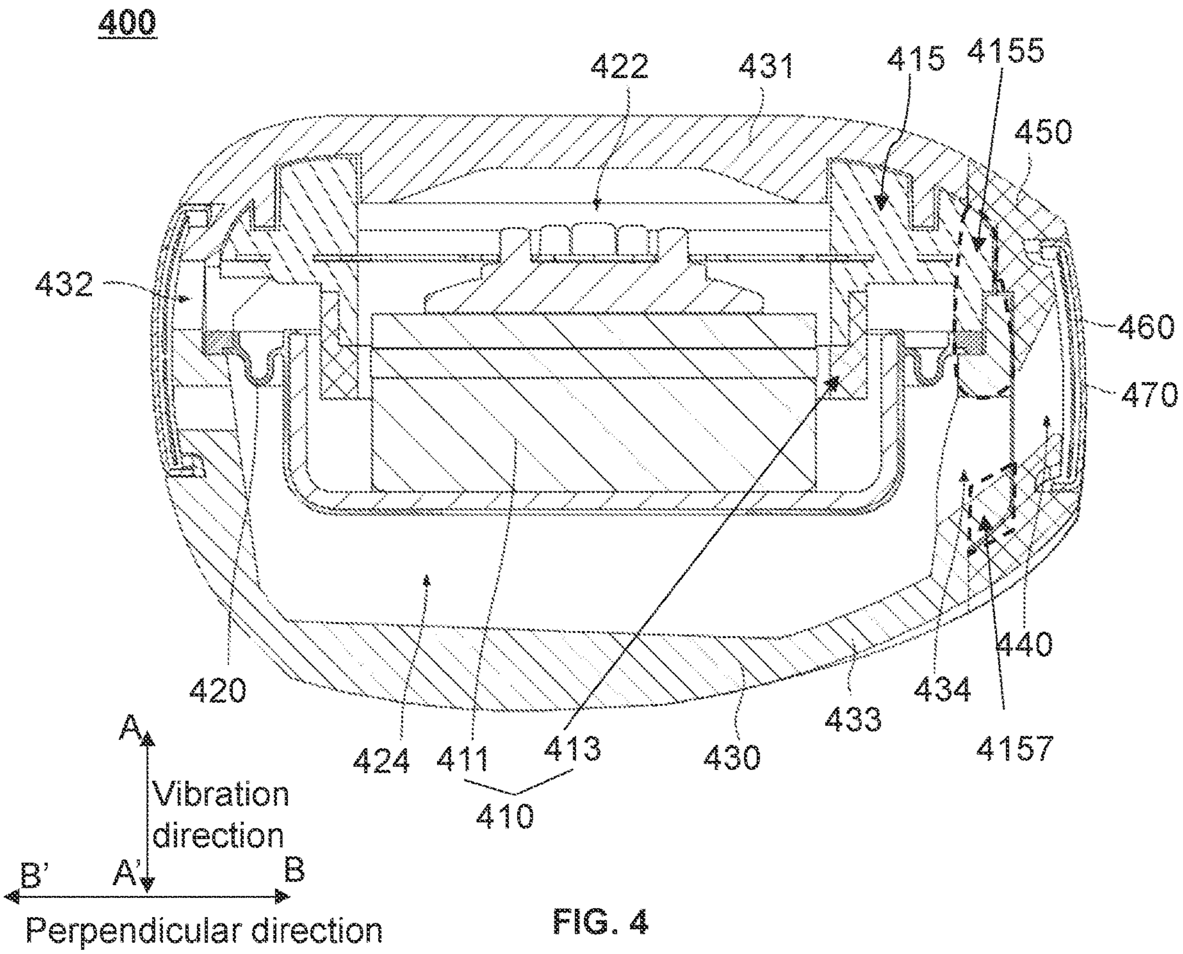
FIG. 4 is a schematic diagram illustrating an exemplary acoustic output device according to some embodiments of the present disclosure.
Figure 5:
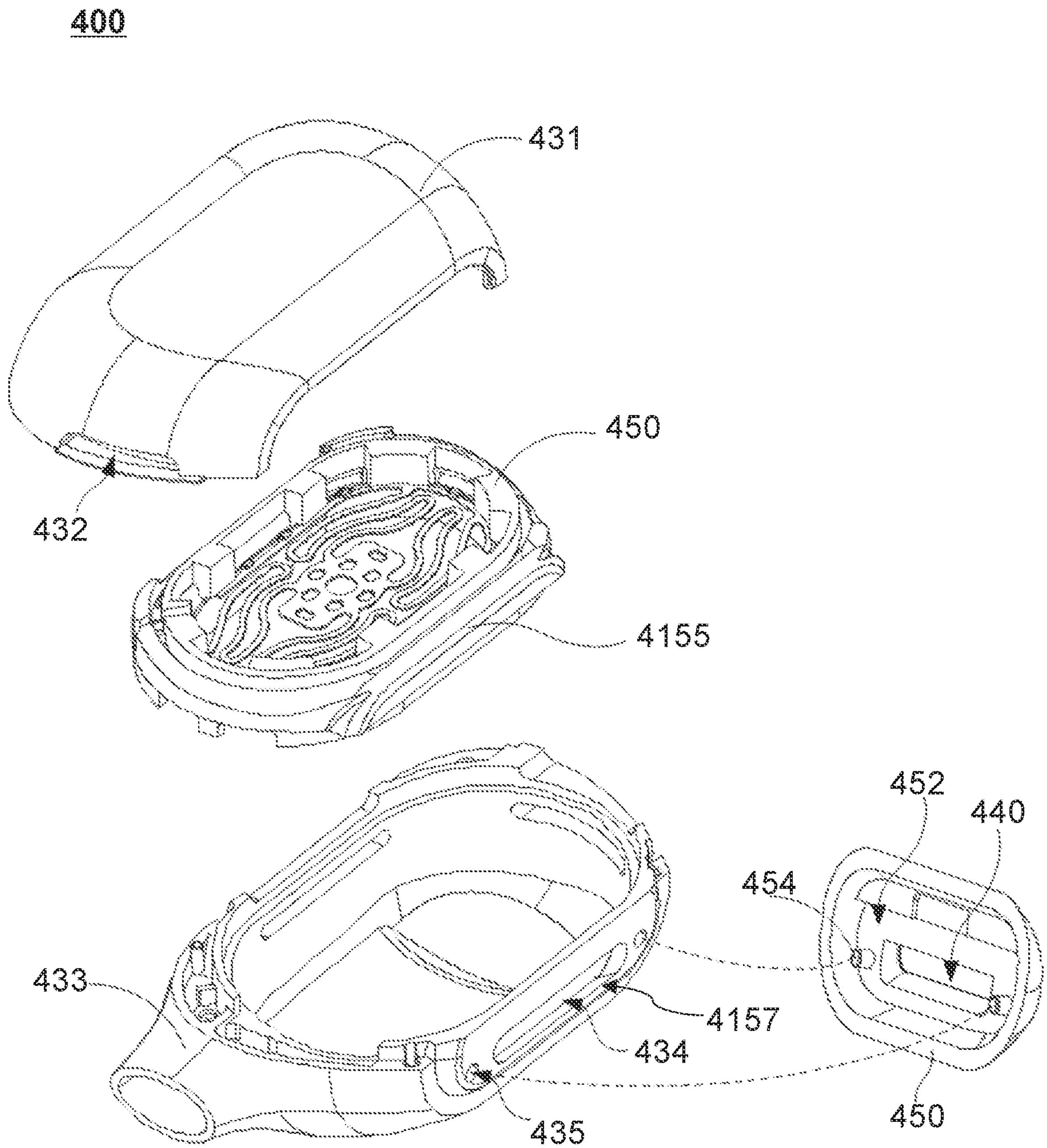
FIG. 5 is an exploded diagram of the acoustic output device in FIG. 4.

FIG. 4 is a schematic diagram illustrating an exemplary acoustic output device according to some embodiments of the present disclosure. FIG. 5 is an exploded diagram of the acoustic output device in FIG. 4. As shown in FIG. 4, an acoustic output device 400 may be similar to the acoustic output device 200A shown in FIG. 2A. For example, the acoustic output device 400 may include a transducer 410, a diaphragm 420, a housing 430, and a sound guiding channel 440. The housing 430 may include a first housing 431 and a second housing 433. The housing 430 may form an accommodating chamber for accommodating at least some elements of the transducer 410 and the diaphragm 420. The accommodating chamber may include a first chamber 422 and a second chamber 424. The first chamber 422 may be configured to accommodate at least a part of the transducer 410. The housing 430 may be provided with a pressure relief hole 432 communicating with the first chamber 422. A sound outlet 434 communicating with the second chamber 424 may be disposed on the housing 430. As another example, the transducer 410 may include a magnetic circuit assembly 411 and a coil 413. More descriptions of the acoustic output device 400 may be found elsewhere in the present disclosure (e.g., FIG. 2A and its descriptions).

In some embodiments, the transducer 410 may further include a coil support 415. The coil support 415 may be disposed in the first chamber 422 for supporting the coil 413. For example, the coil support 415 may fix the coil 413 on the housing 430 (e.g., the first housing 431), and make the coil 413 protrude into a magnetic gap of the magnetic circuit assembly 410. As another example, the coil support 415 may be connected to the housing 430. When the coil 413 vibrates under an action of the magnetic field provided by the magnetic circuit assembly 411, the coil 413 may drive the coil support 415 to vibrate, thereby driving the housing 430 to vibrate.

The acoustic output device 400 may further include a sound conduction component 450. The sound conduction component 450 may be physically connected to the housing 430. The sound guiding channel 440 may be disposed on the sound conduction component 450. In some embodiments, at least a part of the coil support 415 may be exposed laterally from the housing 430 (e.g., the first housing 431) in a direction perpendicular to the vibration direction of the housing 430 (e.g., direction B in FIG. 4). In this case, the sound conduction component 450 may further include a depressed region 452. When the sound conduction component 450 is physically connected to the housing 430, the coil support 415 may be located within the depressed region 452. In other words, a side of the first housing 431 located at the sound conduction component 450 (or the sound outlet 434) may be at least partially cut off, so that the coil support 415 is at least partially exposed to the outside. The sound conduction component 450 may be buckled with an exposed part 4155 of the coil support 415 and the second housing 433, so that the sound guiding channel 440 may communicate with the sound outlet 432. In this way, the first housing 431 on the side where the sound conduction component 450 is located does not need to completely wrap the coil support 415, which may avoid a local over-thickness of the acoustic output device 400 and does not hinder the fixing between the sound conduction component 450 and the housing 430.

Merely by way of example, the exposed part 4155 of the coil support 415 may cooperate with at least part 4157 of the second housing 433 on the side where the sound outlet 434 is located to form a protrude platform. In some embodiments, the at least part 4157 of the second housing 433 may be referred to as a first sub-protrude platform part. The exposed part 4155 of the coil support 415 may also be referred to as a second sub-protrude platform part. In this case, the outlet end of the sound outlet 434 may be located on the top of the first sub-protrude platform part 4157. Correspondingly, the depressed region 452 may be provided on the side of the sound conduction component 450 facing the coil support 415 and the second housing 433. At this time, the inlet end of the sound guiding channel 440 may communicate with the bottom of the depressed region 452. In this way, when the sound conduction component 450 is assembled with the housing 430, the protrude platform may be embedded in the depressed region 452 and make the sound guiding channel 440 communicate with the sound outlet 434. In some embodiments, when the top of the protrude platform is in contact with the depressed bottom of the depressed region 452, the sound conduction component 450 and the housing 430 may be just in contact. In some embodiments, when the top of the protrude platform is in contact with the depressed bottom of the depressed region 452, there may be a gap between the sound conduction component 450 and the housing 430 to improve an air tightness between the sound guiding channel 440 and the sound outlet 434. In some embodiments, an annular seal (not shown in the figure) may further be provided between the top of the protrude platform and the bottom of the depressed region 452.

In some embodiments, the sound conduction component 450 and the housing 430 may be connected by insertion connection. For example, one of the housing 430 (e.g., the second housing 433) and the sound conduction component 450 may be provided with an insertion hole, and the other may be provided with an insertion post. The insertion post may be inserted and fixed in the insertion hole, so as to improve the accuracy and reliability of assembling the sound conduction component 450 and the housing 430. Merely by way of example, as shown in FIG. 5, an insertion hole 435 may be disposed on the second housing 433, for example, the insertion hole 435 may be disposed on the first sub-protrude platform part. An insertion post 454 may be disposed on the sound conduction assembly 450, for example, the insertion post 454 may be disposed in the depressed region 452. The sound conduction component 450 and the housing 430 may be assembled along the direction shown by the dotted line in FIG. 5.

It should be noted that the above description of the acoustic output device 100 is intended to illustrate, not limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. In some embodiments, the acoustic output device 400 may further include an acoustic resistance net 460 and/or a protective cover 470. The acoustic resistance net 460 may adjust the acoustic resistance of the air conduction sound generated in the second chamber 424. The protective cover 470 may be disposed at the periphery of the outlet end of the sound guiding channel 440 to protect the acoustic output device 400 and improve the appearance of the acoustic output device 400.

Figure 6A:
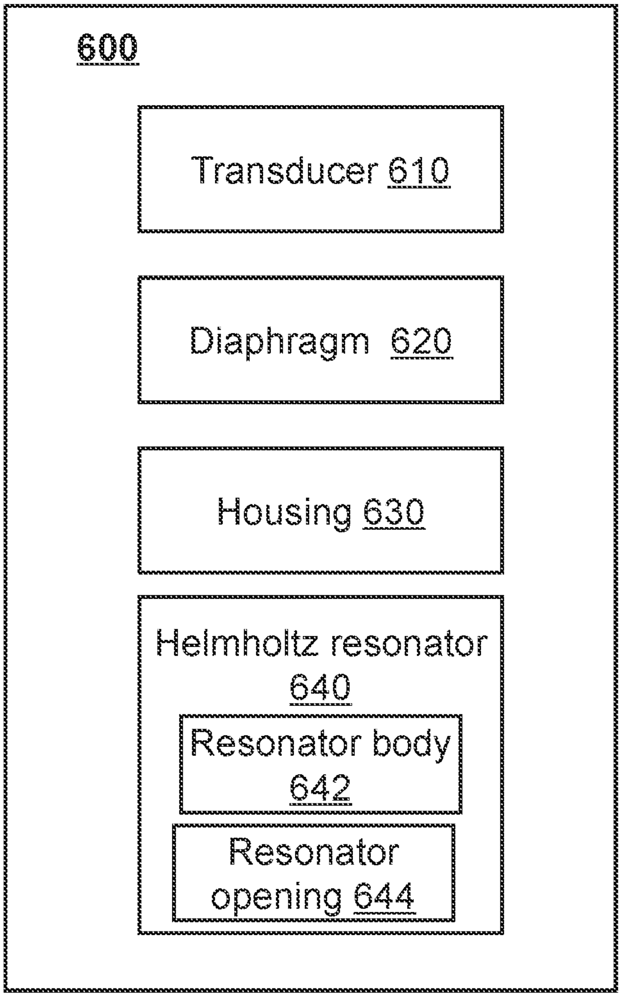
FIG. 6A is a block diagram illustrating an exemplary acoustic output device according to some embodiments of the present disclosure.
Figure 6B:
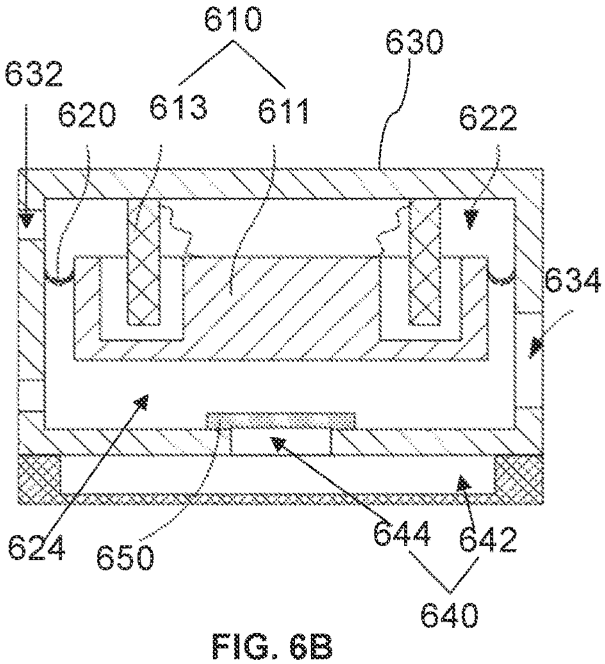
FIGS. 6B to 6E are schematic diagrams illustrating exemplary acoustic output devices according to some embodiments of the present disclosure.
Figure 6C:
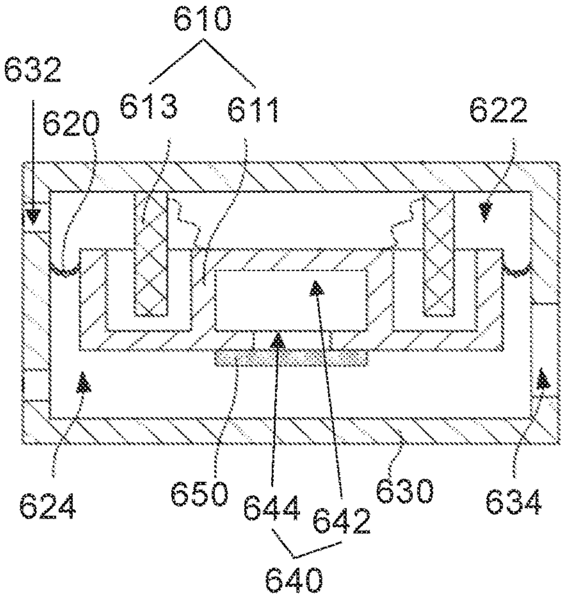
Figure 6D:
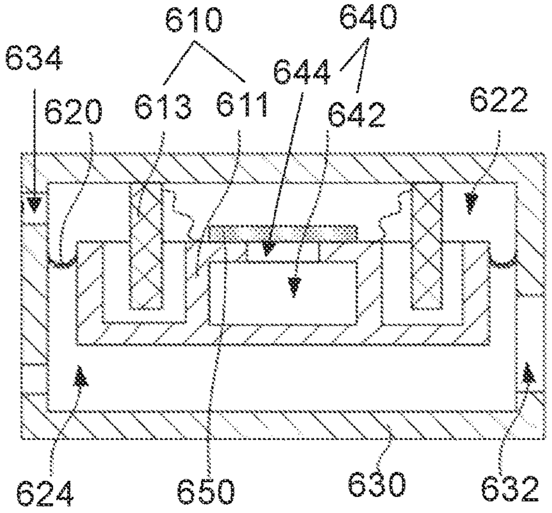

FIG. 6A is a block diagram illustrating an exemplary acoustic output device according to some embodiments of the present disclosure. FIGS. 6B to 6E are schematic diagrams illustrating exemplary acoustic output devices according to some embodiments of the present disclosure. As shown in FIG. 6A, an acoustic output device 600 may be similar to the acoustic output device 200A shown in FIG. 2A. The acoustic output device 600 may include a transducer 610, a diaphragm 620, and a housing 630. Specifically, referring to FIG. 6B to FIG. 6E, the housing 630 may form an accommodating chamber for accommodating at least some elements of the transducer 610 and the diaphragm 620. The accommodating chamber may include a first chamber 622 and a second chamber 624. The first chamber 622 may be configured to accommodate the transducer 610. The housing 630 may be provided with a sound outlet 634 communicating with the accommodating chamber. In some embodiments, the sound outlet 634 may be configured to communicate the first chamber 622 with the outside world (as shown in FIG. 6D). In some embodiments, the sound outlet 634 may be configured to communicate the second chamber 624 with the outside world (as shown in FIGS. 6B and 6C). In some embodiments, the transducer 610 may include a magnetic circuit assembly 611 and a coil 613.

More descriptions of the acoustic output device 600 may be found elsewhere in the present disclosure (e.g., FIG. 2A and its descriptions).

As the chamber (e.g., the second chamber 624) that generates an air conduction sound wave and the sound outlet constitute a Helmholtz resonator structure, a frequency response curve of the air conduction sound wave output by the acoustic output device 600 may generate a first resonance peak at a relatively high frequency band, thereby deteriorating the sound quality of the acoustic output device 600. Specifically, near a peak frequency of the first resonance peak, the sound output by the chamber increases sharply, so that a sound leakage generated by the air conduction sound output by the acoustic output device 600 suddenly increases in the frequency band near the peak frequency of the first resonance peak. As a result, the sound quality becomes unbalanced, and the sound leakage increases. In this case, the sound quality of the acoustic output device 600 may be improved by providing a Helmholtz resonator 640. The Helmholtz resonator 640 may be configured to weaken the resonance intensity at or near the peak of the first resonance peak of the air conduction sound wave. In some embodiments, the resonant frequency of the Helmholtz resonator 640 may be the same as the peak frequency of the first resonance peak. In some embodiments, a difference between the resonant frequency of Helmholtz resonator 640 and the peak frequency of the first resonance peak may be within an octave.

The Helmholtz resonator 640 may include a resonator body 642 and at least one resonator opening 644. In some embodiments, the Helmholtz resonator 640 may communicate with the second chamber 624 to adjust a frequency response of the air conduction sound wave generated in the second chamber 624. The resonator opening 644 may communicate with the resonator body 642 and the second chamber 624. In other words, the resonator opening 644 may be disposed on a sidewall of the second chamber 624. For example, as shown in FIG. 6B, the resonator opening 644 may be disposed on the housing (i.e., the second housing) constituting the second chamber 624, and the resonator body 642 may be suspended outside the second housing. As another example, as shown in FIG. 6C, the resonator opening 644 and the resonator body 642 may be disposed on the magnetic circuit assembly 611. In some embodiments, a difference between a peak resonance intensity of the first resonance peak when the resonator opening 644 of the Helmholtz resonator 640 communicating the second chamber 624 is in an open state and the peak resonance intensity of the first resonance peak when the resonator opening 644 of the Helmholtz resonator 640 communicating the second chamber 624 is in a closed state is greater than or equal to 3 dB, specifically, the difference may be 5 dB, 10 dB, 15 dB, 20 dB and so on.

Figure 7:
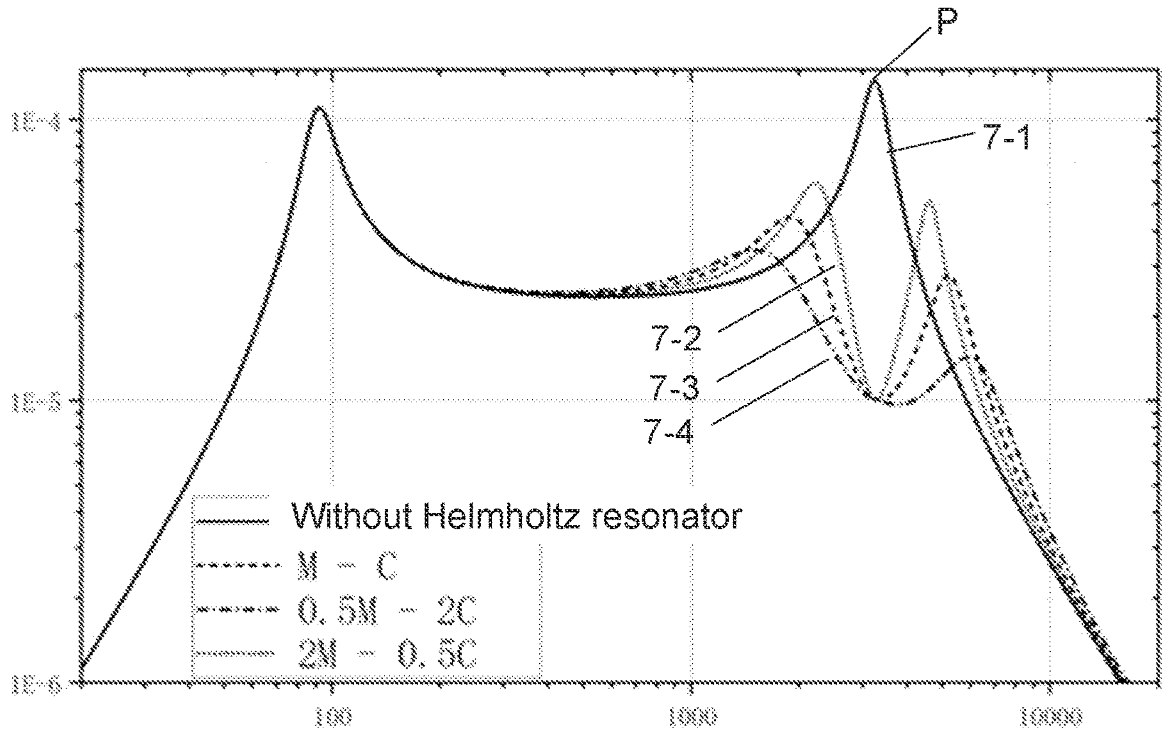
FIG. 7 is a diagram illustrating air conduction acoustic wave frequency response curves of acoustic output devices according to some embodiments of the present disclosure.
Figure 8:
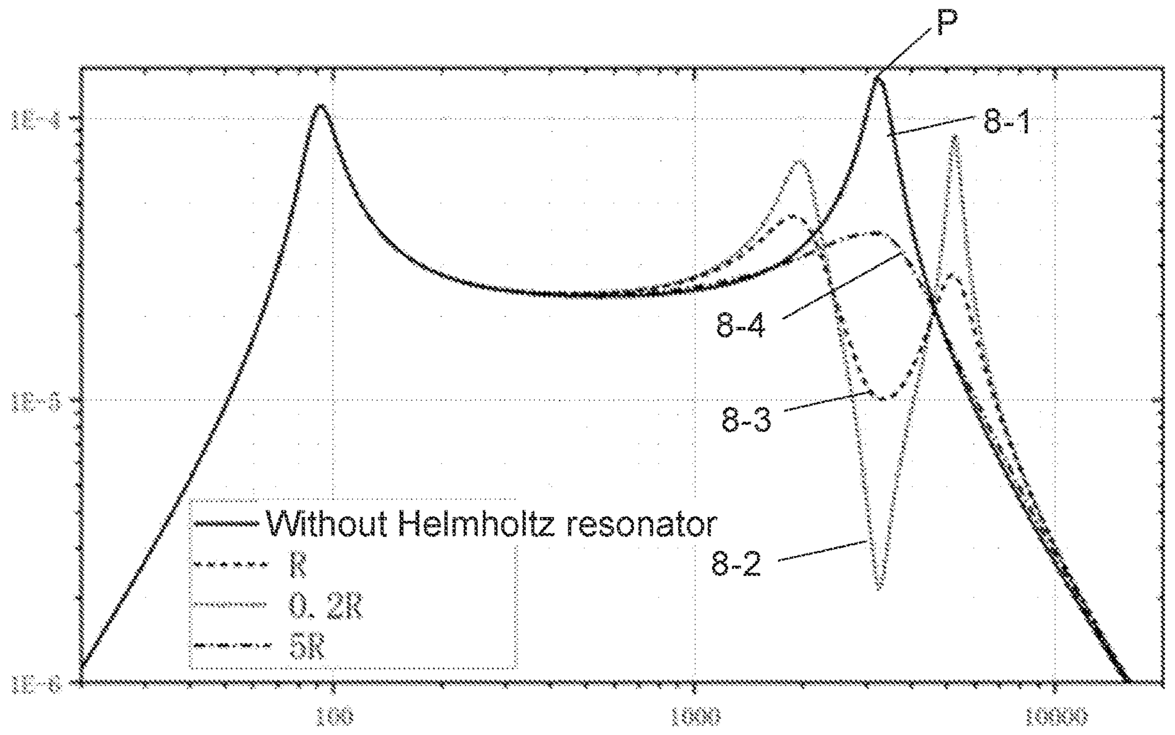
FIG. 8 is a diagram illustrating frequency response curves of air conduction sound waves of acoustic output devices according to some embodiments of the present disclosure.

In some embodiments, it can be seen from formula (1) that different weakening effects of the Helmholtz resonator 640 on the first resonance peak may be obtained by setting one or more parameters of the Helmholtz resonator 640. For example, different volumes of the resonator body 642 and/or cross-sectional areas of the sound outlet 634 may be set to obtain different weakening effects of the Helmholtz resonator 640 on the first resonance peak (as shown in FIG. 7). As another example, a sound guiding channel may be provided at the sound outlet 634, and different weakening effects of the Helmholtz resonator 640 on the first resonance peak may be obtained by setting a length of the sound guiding channel. As another example, different weakening effects of the Helmholtz resonator 640 on the first resonance peak may be obtained by setting an acoustic resistance net at the resonator opening 644 (as shown in FIG. 8). In some embodiments, the volume of the resonator body 642 of the Helmholtz resonator 640 may be the same as or different from the volume of the second chamber 624. It should be known that, in some embodiments, a mass of the magnetic circuit assembly 611 is greater than that of the housing 630, and an amplitude of the magnetic circuit assembly 611 is smaller than that of the housing 630 under the same driving force, especially at a middle and high frequency band (e.g., greater than 1 kHz). In other words, during an actual working process of the acoustic output device 600, the vibration amplitude of the magnetic circuit assembly 611 is smaller than that of the housing 630. Based on this, disposing the Helmholtz resonator 640 on the magnetic circuit assembly 611 can obtain a wall with less vibration, which can absorb a sound energy and weaken the first resonance peak more significantly.

In some embodiments, the Helmholtz resonator 640 may communicate with the first chamber 622 to adjust the frequency response of an air conduction sound wave generated in the first chamber 622. The resonator opening 644 may communicate the resonator body 642 and the first chamber 622. The air conduction sound wave may be generated in the first chamber 622 and transmitted to the user's ear canal through the sound outlet 634. In this case, the housing 630 may not be in contact with the user's skin, that is, the acoustic output device 600 may not generate a bone conduction sound wave. For example, as shown in FIG. 6D, both the resonator opening 644 and the resonator body 642 may be disposed on the magnetic circuit assembly 611, and the resonator opening 644 may communicate with the first chamber 622. In some embodiments, a difference between the peak resonance intensity of the first resonance peak when the resonator opening 644 of the Helmholtz resonator 640 communicating the first chamber 622 is in an open state and the peak resonance intensity of the first resonance peak when the resonator opening 644 of the Helmholtz resonator 640 communicating the first chamber 622 is in a closed state is greater than or equal to 3 dB, specifically, the difference may be 5 dB, 10 dB, 15 dB, 20 dB, and so on.

Figure 6E:
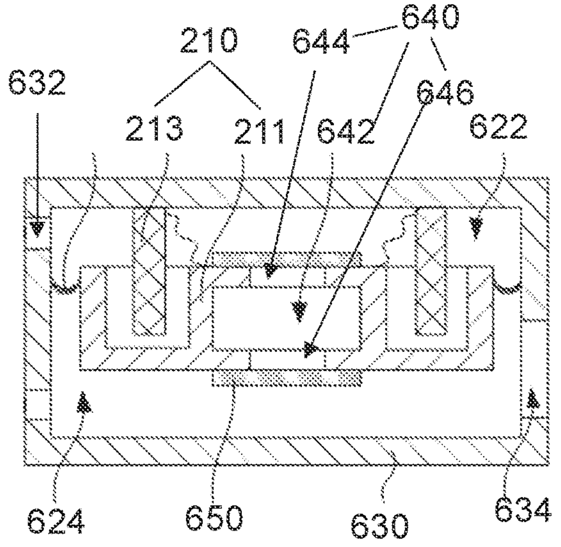

In some embodiments, the Helmholtz resonator 640 may communicate with the first chamber 622 and the second chamber 624 at the same time for simultaneously adjusting frequency responses of the air conduction sound wave (also referred to as the sound leakage generated in the first chamber 622) generated in the first chamber 622 and the air conduction sound wave generated in the second chamber 624. For example, as shown in FIG. 6E, the Helmholtz resonator 640 may include a resonator opening 644 (also referred to as a first resonator opening) communicating with the first chamber 622 and a resonator opening 646 communicating with the second chamber 624 (also referred to as the second resonator opening). In some embodiments, an area of the first resonator opening 644 may be greater than or equal to an area of the second resonator opening 646.

In some embodiments, at least one resonator opening may further be provided with a second acoustic resistance net 650. In some embodiments, a porosity of the second acoustic resistance net 650 may be greater than or equal to 3%. In some embodiments, the porosity of the second acoustic resistance net 650 may be greater than or equal to 4%. In some embodiments, the porosity of the second acoustic resistance net 650 may be greater than or equal to 5%. In some embodiments, the porosity of the second acoustic resistance net 650 may be greater than or equal to 10%. In some embodiments, the porosity of the second acoustic resistance net 650 may be greater than or equal to 15%. In some embodiments, the porosity of the second acoustic resistance net 650 may be greater than or equal to 30%. In some embodiments, the porosity of the second acoustic resistance net 650 may be greater than or equal to 50%. In some embodiments, the porosity of the second acoustic resistance net 650 may be 100%.

As shown in FIG. 8, as the acoustic resistance of the second acoustic resistance net 650 increases, the frequency response curve of the air conduction sound wave of the acoustic output device 600 is flatter, and the sound quality is more balanced. In some embodiments, the acoustic resistance of the second acoustic resistance net 650 may range between 0-1000 MKSrays. In some embodiments, the acoustic resistance of the second acoustic resistance net 650 may range between 50-900 MKSrays. In some embodiments, the acoustic resistance of the second acoustic resistance net 650 may range between 100-800 MKSrays. In some embodiments, the acoustic resistance of the second acoustic resistance net 650 may range between 200-700 MKSrays. In some embodiments, the acoustic resistance of the second acoustic resistance net 650 may range between 300-600 MKSrays. In some embodiments, the acoustic resistance of the second acoustic resistance net 650 may range between 400-500 MKSrays.

It should be noted that the above description of the acoustic output device 600 is intended to be illustrative, not limiting the scope of the present disclosure. Many alternatives, modifications, and variations will be apparent to those of skilled in the art. The features, structures, methods, and other characteristics of the exemplary embodiments described herein may be combined in various ways to obtain additional and/or alternative exemplary embodiments. For example, similarly, when the housing 630 is further provided with a pressure relief hole 632, an interaction of the chamber communicating with the pressure relief hole 632 and the pressure relief hole 632 may further be equivalent to a Helmholtz resonator structure. At this time, the acoustic output device 600 may further include a Helmholtz resonator communicated with the chamber, so as to weaken the resonance peak of the air conduction sound wave generated by the chamber, thereby improving the sound quality of the acoustic output device 600.

FIG. 7 is a diagram illustrating air conduction acoustic wave frequency response curves of acoustic output devices according to some embodiments of the present disclosure. As shown in FIG. 7, M indicates an area of a resonator opening of a Helmholtz resonator. C indicates a volume of a resonator body of the Helmholtz resonator. Curve 7-1 represents a frequency response curve of an acoustic output device without a Helmholtz resonator. Curve 7-2 represents a frequency response curve of an acoustic output device provided with a Helmholtz resonator, wherein the area of the resonator opening of the Helmholtz resonator is 2M, and the volume of the resonator body is 0.5C. Curve 7-3 represents a frequency response curve of an acoustic output device provided with a Helmholtz resonator, wherein the area of the resonator opening of the Helmholtz resonator is M, and the volume of the resonator body is C. Curve 7-4 represents a frequency response curve of an acoustic output device provided with a Helmholtz resonator, the area of the resonator opening of the Helmholtz resonator is 0.5M, and the volume of the resonator body is 2C. It can be seen from FIG. 7 that different volumes of the resonator bodies and different cross-sectional areas of the resonator openings may make different Helmholtz resonators have the same resonant frequency. When the acoustic output device is not equipped with the Helmholtz resonator (corresponding to curve 7-1), due to an interaction between a second chamber generating the air conduction sound wave and a sound outlet and/or a sound guiding channel, the frequency response curve of the air conduction sound wave output by the acoustic output device may generate the first resonance peak P in a relatively high frequency band, which may lead to a deterioration of the sound quality of the acoustic output device. The resonant frequency of the Helmholtz resonator may be kept constant by setting the area (i.e., M) of the resonator opening and/or the volume (i.e., C) of the resonator body of the Helmholtz resonator. When the Helmholtz resonator used to weaken the first resonance peak P of the air conduction sound wave is set in the acoustic output device, as the area (i.e., M) of the resonator opening decreases and as the volume (i.e., C) of the resonator body increases, the Helmholtz resonator weakens the first resonance peak P with a wider bandwidth, and the weakening effect is more significant.

FIG. 8 is a diagram illustrating frequency response curves of air conduction sound waves of acoustic output devices according to some embodiments of the present disclosure. As shown in FIG. 8, R indicates an acoustic resistance of a second acoustic resistance net provided at a resonator opening of a Helmholtz resonator. Curve 8-1 represents a frequency response curve of an acoustic output device without a Helmholtz resonator. Curve 8-2 represents a frequency response curve of an acoustic output device provided with a Helmholtz resonator and a second acoustic resistance net with an acoustic resistance of 0.2R at the resonator opening of the Helmholtz resonator. Curve 8-3 represents a frequency response curve of an acoustic output device provided with a Helmholtz resonator and a second acoustic resistance net with an acoustic resistance R at the resonator opening of the Helmholtz resonator. Curve 8-4 represents a frequency response curve of an acoustic output device provided with a Helmholtz resonator and a second acoustic resistance net with an acoustic resistance of 5R at the resonator opening of the Helmholtz resonator. In FIG. 8, when the acoustic output device is not equipped with the Helmholtz resonator (corresponding to curve 8-1), the frequency response curve of the air conduction sound wave output by the acoustic output device may produce a first resonance peak P in a relatively high frequency band. When the Helmholtz resonator used to weaken the first resonance peak P of the air conduction sound wave is set in the acoustic output device, with an increase of the acoustic resistance of the second acoustic resistance net set located at the resonator opening, the frequency response curve of the acoustic output device is flatter. In other words, by setting the Helmholtz resonator and adjusting the acoustic resistance of the second acoustic resistance net, the sound quality of the acoustic output device may be more balanced.

Figure 9:
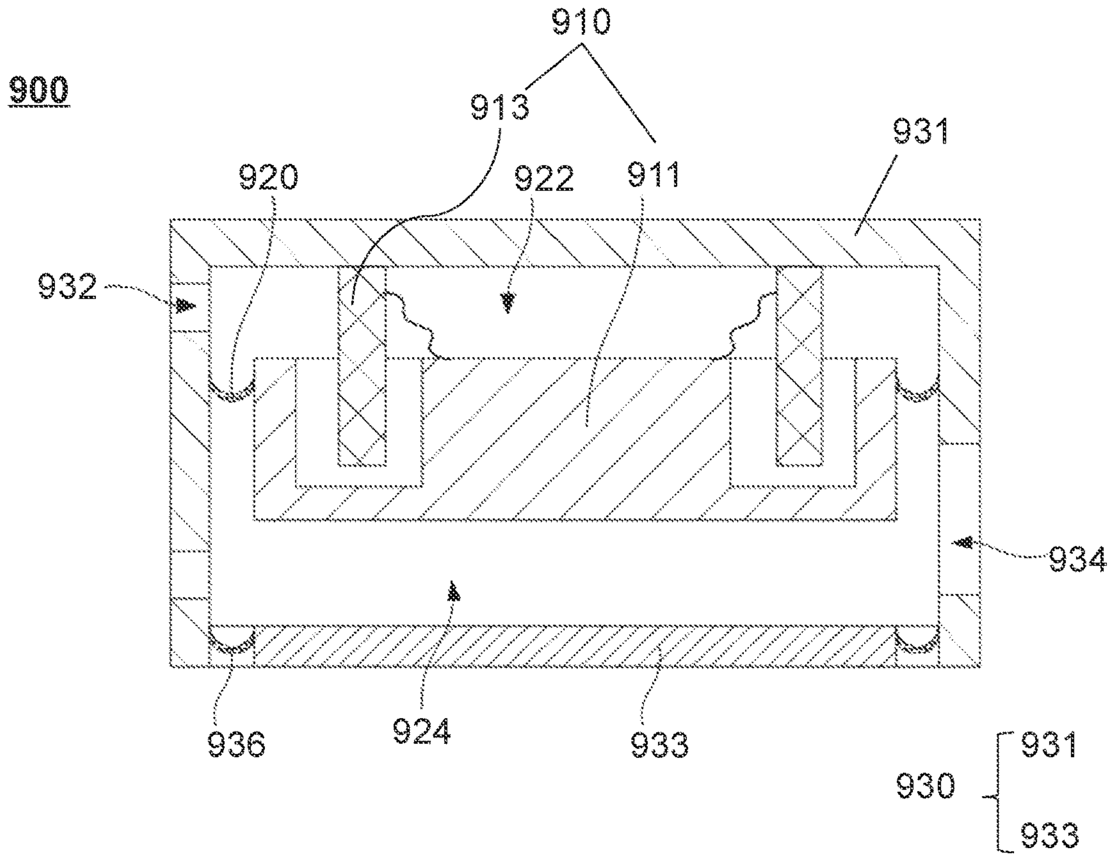
FIG. 9 is a schematic diagram illustrating an exemplary acoustic output device according to some embodiments of the present disclosure.
Figure 10:
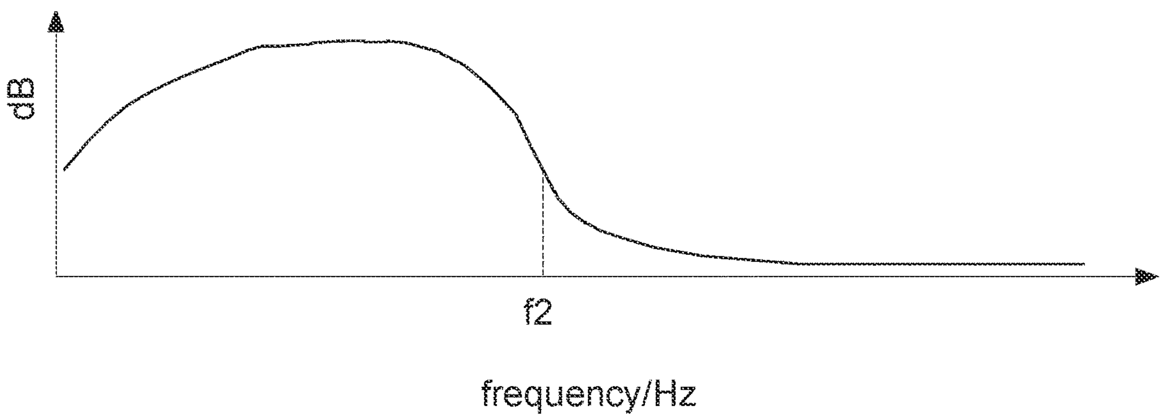
FIG. 10 is a diagram illustrating a frequency response curve of an air conduction sound wave of an acoustic output device according to some embodiments of the present disclosure.

FIG. 9 is a schematic diagram illustrating an exemplary acoustic output device according to some embodiments of the present disclosure. FIG. 10 is a diagram illustrating a frequency response curve of an air conduction sound wave of an acoustic output device according to some embodiments of the present disclosure. As shown in FIG. 9, an acoustic output device 900 may be similar to the acoustic output device 200A shown in FIG. 2A. For example, the acoustic output device 900 may include a transducer 910, a diaphragm 920, and a housing 930. The housing 930 may form an accommodating chamber for accommodating at least some elements of the transducer 910 and the diaphragm 920. The accommodating chamber may include a first chamber 922 and a second chamber 924. The first chamber 922 may be configured to accommodate the transducer 910. The housing 930 may be provided with a sound outlet 934 communicating with the second chamber 924. The housing 930 may further be provided with a pressure relief hole 932 communicating with the first chamber 922. The transducer 910 may include a magnetic circuit assembly 911 and a coil 913. More descriptions of the acoustic output device 900 may be found elsewhere in the present disclosure (e.g., FIG. 2A and its descriptions).

The housing 930 may include a first housing 931 (also referred to as a main housing) and a second housing 933 (also referred to as an auxiliary housing). The first housing 931 and the second housing 933 may be connected to constitute the housing 930. The first housing 931 may constitute at least a part of the first chamber 922, and the second housing 933 may constitute at least a part of the second chamber 924. In some embodiments, a second material for manufacturing the second housing 933 may be the same as a first material for manufacturing the first housing 931. Specifically, the second housing 933 may be connected to the first housing 931 through an elastic connector 936, and may cooperate with the diaphragm 920 to form the second chamber 924. In this case, the first housing 931, the transducer 910 (e.g., a spring plate connected to the first housing 931 in the transducer 910), and the diaphragm 920 may form a vibration system with a natural frequency f1. The second housing 933 and the elastic connector 936 may form a vibration system with a natural frequency f2. In some embodiments, the second material for manufacturing the second housing 933 may be different from the first material for manufacturing the first housing 931. Specifically, the second housing 933 may have a different elastic coefficient from that of the first housing 931. In this case, the first housing 931 may have the natural frequency f1 corresponding to the first material, and the second housing 933 may have the natural frequency f2 corresponding to the second material. In some embodiments, the natural frequency f1 related to the first housing 931 may further be referred to as a first resonant frequency of the first housing 931, and the natural frequency f2 related to the second housing 933 may further be referred to as a second resonant frequency of the second housing 933. It should be known that the resonant frequency of the housing (e.g., the first housing 931 and the second housing 933) may be measured by a laser vibrometer, an accelerometer, etc., which is not limited in the present disclosure. For example, the laser vibrometer may be configured to measure the vibration of an outer surface of the second housing 933, so as to measure the second resonant frequency f2 of the second housing 933. As another example, the accelerometer may be bonded or mechanically installed on a surface of the second housing 933, and the vibration of the outer surface of the second housing 933 may be measured by the accelerometer, so as to determine the second resonant frequency f2 of the second housing 933.

In some embodiments, the first resonant frequency may be less than the second resonant frequency. At this time, the air conduction sound wave of the acoustic output device 900 may be controlled by adjusting the second resonant frequency of the second housing 933. As shown in FIG. 10, f2 indicates the second resonant frequency of the second housing 933. It can be seen from FIG. 10 that the acoustic output device 900 may output a stronger air conduction sound wave in a frequency band lower than the second resonant frequency of the second housing 933. The acoustic output device 900 hardly outputs any air conduction sound wave in the frequency band higher than the second resonant frequency of the second housing 933. Specifically, during the vibration process of the first housing 931, due to a relationship between the force and the reaction force, the transducer 910 and/or the diaphragm 920 may be considered to be almost stationary or vibrate towards a direction opposite to the first housing 931. When the vibration frequency of the first housing 931 is lower than the second resonant frequency (e.g., between 20 Hz to 150 Hz or between 20 Hz to 400 Hz), a phase difference between the second housing 933 and the first housing 931 may be between-$\pi/3$ and $+\pi/3$. At this time, the vibration directions of the second housing 933 and the first housing 931 may be the same, that is, the first housing 931 and the second housing 933 may be in the same phase. Since the transducer 910 and/or the diaphragm 920 vibrate in the opposite direction to the second housing 933, the air (that is, the air in the second chamber 924) between the second housing 933 and the diaphragm 920 may be compressed or expanded, so as to generate the air conduction sound wave that is output to the outside of the acoustic output device 900 through the sound outlet 934. When the vibration frequency of the first housing 931 is greater than the second resonant frequency (e.g., the vibration frequency of the first housing 931 is between 2 kHz to 4 kHz or between 1 kHz to 2 kHz), the phase difference between the second housing 933 and the first housing 931 may be between $2\pi/3$ and $4\pi/3$. At this time, the vibration directions of the second housing 933 and the first housing 931 may be opposite, while the vibration directions of the second housing 933 and the vibration direction of the transducer 910 and/or the diaphragm 920 are the same. At this time, the air in the second chamber 924 is not easily compressed or expanded, and thus it is difficult to generate the air conduction sound wave output to the outside of the acoustic output device 900 through the sound outlet 934.

In short, by reasonably designing the second resonant frequency of the second housing 933, the acoustic output device 900 may be controlled to generate the air conduction sound wave output to the outside of the acoustic output device 900 through the sound outlet 934 in a specific frequency band (e.g., a low frequency band less than f2), while in another frequency band (e.g., a high frequency band greater than f2), almost no air conduction sound wave is output to the outside of the acoustic output device 900 through the sound outlet 934. In other words, by adjusting the second resonant frequency of the second housing 933, a specific frequency band of the bone conduction sound wave may be supplemented by the air conduction sound wave.

In some embodiments, a magnitude of the second resonant frequency may be adjusted according to parameters such as an elastic coefficient of the second housing 933 and/or the elastic connector 936, which is not limited here. In some embodiments, the second resonant frequency may be less than or equal to 10 KHz. In some embodiments, the second resonant frequency may be less than or equal to 8 kHz. In some embodiments, the second resonant frequency may be less than or equal to 6 KHz. In some embodiments, the second resonant frequency may be less than or equal to 5 KHz. In some embodiments, the second resonant frequency may be less than or equal to 3 kHz. In some embodiments, the second resonant frequency may be less than or equal to 2 kHz. In some embodiments, the second resonant frequency may be less than or equal to 1 kHz. In some embodiments, the second resonant frequency may be less than or equal to 0.5 kHz.

Figure 11:
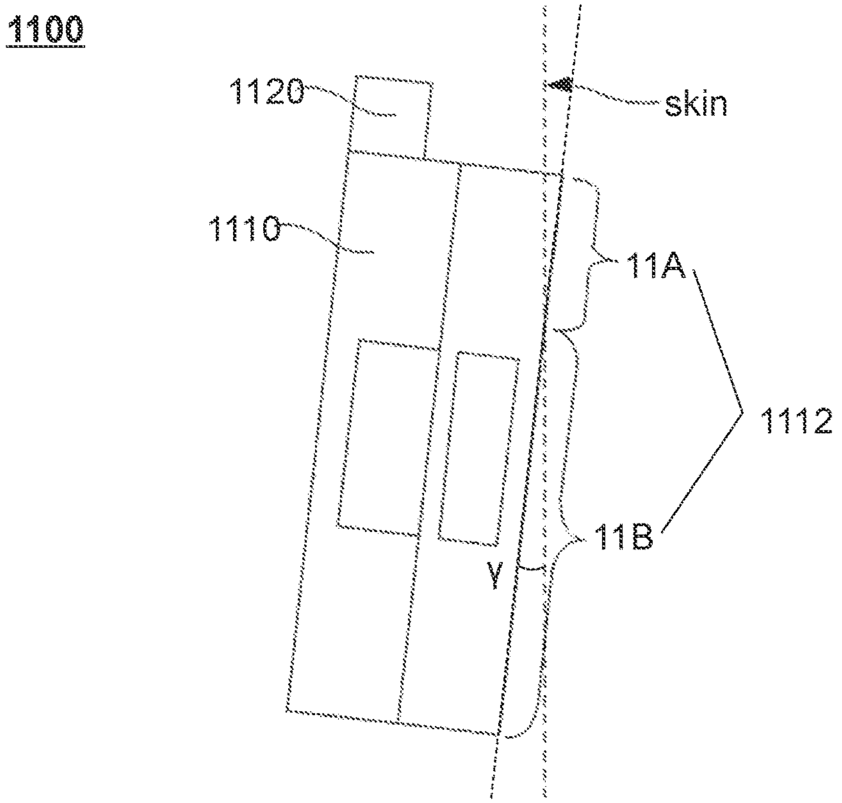
FIG. 11 is a schematic diagram illustrating an exemplary acoustic output device according to some embodiments of the present disclosure.

FIG. 11 is a schematic diagram illustrating an exemplary acoustic output device according to some embodiments of the present disclosure. As shown in FIG. 11, an acoustic output device 1100 may be similar to the acoustic output device 200A shown in FIG. 2A. For example, the acoustic output device 1100 may include a speaker assembly. The speaker assembly may include a core module (e.g., a transducer, a diaphragm) and a housing 1110. The housing 1110 may form an accommodating chamber for accommodating at least some elements of the transducer and the diaphragm. The accommodating chamber may include a first chamber and a second chamber. The first chamber may be configured to accommodate at least a part of the transducer. The housing 1110 may be provided with a sound outlet communicating with the second chamber. A pressure relief hole communicating with the first chamber may further be provided on the housing 1110. As another example, the transducer may include a magnetic circuit assembly and a coil. More descriptions of the acoustic output device 1100 may be found elsewhere in the present disclosure (e.g., FIG. 2A and its descriptions).

Based on the foregoing descriptions about the speaker assembly, when the acoustic output device 1100 is an air conduction and bone conduction combined acoustic output device, a skin contact area 1112 (also referred to as the first housing 1112) of the housing 1110 is configured to contact the user's skin, so as to transmit the mechanical vibration generated by the core module, and then form a bone conduction sound wave. While the acoustic output device 1100 is generating the bone conduction sound wave, the transducer and the housing 1110 move relative to each other. Further, due to the existence of the diaphragm, the second chamber generates an air conduction sound wave that is in phase with the bone conduction sound and is transmitted to the human ear through the sound outlet. When the housing 1110 (i.e., the first housing 1112) is in contact with the user, a mechanical property (e.g., an elasticity, a damping, a mass) of the user's skin may adversely affect a vibration state of the core module. Specifically, the better and tighter the housing 1110 (i.e., a first area 11A in the first housing 1112) fits the user's skin, the weaker the vibration of the housing 1110. Furthermore, the weakening of the vibration of the housing 1110 may weaken the relative motion between the housing 1110 and the transducer/the diaphragm, and as a result, the air conduction sound also becomes weaker, which ultimately affects the quality of the air conduction sound heard. However, the housing 1110 cannot be completely separated from the user's skin, as the complete separation may affect the transmission of the bone conduction sound wave, thereby affecting the quality of the bone conduction sound heard.

To reduce a closeness of the housing 1110 to the skin so as to weaken the influence of the skin on the vibration of the core module and make the housing 1110 and/or the diaphragm vibrate to generate enough air conduction sound waves without reducing the transmission efficiency of the bone conduction sound wave, a contact area between the housing and the user's skin may be reduced. For example, the skin contact area 1112 may be inclined. In some embodiments, the skin contact area 1112 may include the first area 11A and a second area 11B. The acoustic output device 1100 may further include a support assembly 1120 (e.g., the ear hook 122 in FIG. 1B). One end of the support assembly 1120 may be connected to the housing 1110 for supporting the speaker assembly. The second area 11B may be farther away from the support assembly 1120 than the first area 11A. When wearing the acoustic output device 1100, the first area 11A of the skin contact area 1112 may be in contact with the user's skin to be driven by the transducer to vibrate and generate the bone conduction sound wave. The second area 11B of the skin contact area 1112 may be not contacted (e.g., inclined or spaced apart) the user's skin. In some embodiments, the first area 11A and the second area 11B may be coplanar to reduce a processing difficulty of the housing 1110. For example, a certain angle may be set between the housing 1110 and the support assembly 1120 so that the acoustic output device 1100 is inclined and spaced relative to the user's skin in the wearing state. In some embodiments, the first area 11A and the second area 11B may not be coplanar. For example, the first area 11A and the second area 11B may be respectively located on two planes, and the two planes may be joined by an arc surface. As another example, the first area 11A and the second area 11B may respectively be different parts of one arc surface.

In some embodiments, an inclination angle of the skin contact area 1112 (i.e., an included angle $\gamma$ between the second area 11B and the user's skin) may be set according to actual needs. In the present disclosure, the included angle $\gamma$ between the second area 11B and the user's skin may refer to an average value of the maximum angle and the minimum angle between a tangential plane of the second area 11B and the plane where the user's skin is located. In some embodiments, the included angle $\gamma$ between the second area 11B and the user's skin may range between 0°-45°. In some embodiments, the included angle $\gamma$ between the second area 11B and the user's skin may range between 2°-40°. In some embodiments, the included angle $\gamma$ between the second area 11B and the user's skin may range between 5°-35°. In some embodiments, the included angle $\gamma$ between the second area 11B and the user's skin may range between 10°-30°. In some embodiments, the included angle $\gamma$ between the second area 11B and the user's skin may range between 15°-25°. In some embodiments, an area of the second area 11B may be greater than an area of the first area 11A.

Figure 12:
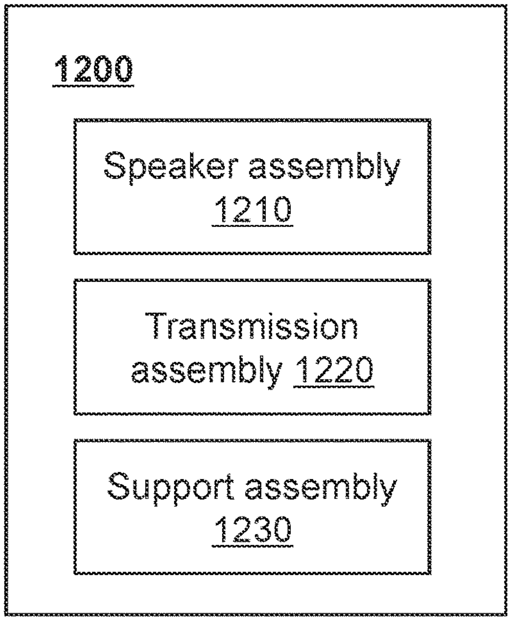
FIG. 12 is a block diagram illustrating an exemplary acoustic output device according to some embodiments of the present disclosure.

FIG. 12 is a block diagram illustrating an exemplary acoustic output device according to some embodiments of the present disclosure. As shown in FIG. 12, an acoustic output device 1200 may include a speaker assembly 1210, a transmission assembly 1220, and a support assembly 1230. The speaker assembly 1210 may be connected to the support assembly 1230 via the transmission assembly 1220.

The speaker assembly 1210 may be configured to generate a mechanical vibration signal (e.g., a bone conduction sound wave and/or an air conduction sound wave) according to an electrical signal. The electrical signal may contain sound information. The sound information may be a video file or an audio file with a specific data format, or may be general data or a file that can be finally converted into sound in a specific way. The electrical signal may be received from sources such as a microphone, a computer, a mobile phone, an MP3 player, etc. For example, a microphone may receive the sound signal from a sound source. Then, the microphone may convert the received sound signal into an electrical signal, and transmit the electrical signal to the speaker assembly 1210. As another example, the speaker assembly 1210 may be connected to or in communication with an MP3 player. The MP3 player may transmit the electrical signal directly to the speaker assembly 1210. In some embodiments, the speaker assembly 1210 may connect and/or communicate with a signal source via a wired connection, a wireless connection, or a combination thereof. The wired connection may include, for example, an electrical cable, a fiber optic cable, a telephone line, etc., or any combination thereof. The wireless connection may include a Bluetooth™ net, a local area networks (LAN), a wide area networks (WAN), a near field communication (NFC) net, a ZigBee™ net, etc., or any combination thereof. More descriptions of the speaker assembly may be found elsewhere in the present disclosure (e.g., FIG. 2A and its description).

The transmission assembly 1220 may be physically connected to the speaker assembly 1210. Accordingly, the transmission assembly 1220 may receive the vibration signal from the speaker assembly 1210. When the acoustic output device 1200 is worn on the user, an angle between the transmission assembly 1220 and the user may be formed. In the present disclosure, the angle between the transmission assembly 1220 and the user refers to an angle between the long axis of the transmission assembly 1220 and a plane where the skin of the user is located. In some embodiments, the angle may be within an angle range of 0° to 90°, or 0° to 70°, or 5° to 50°, or 10° to 50°, or 10° to 30°, etc.

The transmission assembly 1220 may be configured to contact the user through the skin contact area on the transmission assembly 1220, and transmit the received vibration signal to the user through the skin contact area. In some embodiments, an area of the contact area between the transmission assembly 1220 and the user (e.g., the user's skin) may change in response to the vibration signal. In some embodiments, the skin contact area on the transmission assembly 1220 may be provided, for example, on the forehead, the neck (e.g., the throat), the face (e.g., an area around the mouth, the chin), the top of the head, a mastoid, an area around an ear, a temple, etc., or any combination thereof.

The skin contact area on the transmission assembly 1220 may be at a distance from the speaker assembly 1210. The speaker assembly 1210 may vibrate around a rotation axis near the skin contact area of the transmission assembly 1220. In this case, the skin contact area on the transmission assembly 1220 may be closer to the rotation axis than that of the speaker assembly 1210. Accordingly, a vibration intensity of the skin contact area on the transmission assembly 1220 may be less than the vibration intensity of the speaker assembly 1210, thereby reducing the vibration transmitted to the user. For example, the transmission assembly 1220 may include an elastic element with at least one arc structure. The skin contact area of the transmission assembly 1220 may be on a convex part of the at least one arc structure. The speaker assembly 1210 may vibrate around the skin contact area in response to the vibration signal. More descriptions of the arc structure may be found elsewhere in the present disclosure (e.g., FIG. 14 and its descriptions). As another example, the transmission assembly 1220 may include a connection unit, a vibration transmission plate, and an elastic element. The speaker assembly 1210 may be disposed on an upper surface of the connection unit, and the vibration transmission plate may be connected to one end of the connection unit. The skin contact area of the transmission assembly 1220 may be provided on the vibration transmission plate. The support assembly 1230 may be connected to the connection unit or the vibration transfer plate through the elastic element. The speaker assembly 1210 may vibrate around a connection point between the support assembly 1230 and the elastic element in response to the vibration signal. More descriptions of the transmission assembly with the connection unit, the vibration transmission plate, and the elastic element may be found elsewhere in the present disclosure (e.g., FIG. 13 and its descriptions).

In some embodiments, the skin contact area of the transmission assembly 1220 may be positioned in a region around the ear, so that one surface of the speaker assembly 1210 may face the user's ear canal. In this way, when the vibration speaker 1210 vibrates, the speaker assembly 1210 may drive the air around the vibration speaker 1210 to vibrate and generate the air conduction sound wave. The air conduction sound wave may be transmitted via the air to the ear, thereby enhancing the sound intensity delivered to the user. Therefore, the user can not only hear the bone conduction sound wave generated by the vibration of the skin contact area of the transmission assembly 1220, but also the air conduction sound wave generated by the speaker assembly 1210 driving the surrounding air.

In some embodiments, the housing of the speaker assembly 1210 may include, for example, one or more sound outlets disposed on a side wall of the housing or at a side facing the user's ear canal. In this way, when the speaker assembly 1210 vibrates, the air conduction sound wave generated in the housing (e.g., the second chamber) of the speaker assembly 1210 may be transmitted to the outside of the housing through the one or more sound outlet outlets, and further transmitted to the user's ear. In some embodiments, when the user wears the acoustic output device 1200, the one or more sound outlets of the speaker assembly 1210 may be arranged toward the user's ear canal. Therefore, the user may further hear the air conduction sound wave transmitted by the one or more sound outlets of the speaker assembly 1210, thereby enhancing the sound intensity heard by the user.

The support assembly 1230 may be physically connected to the speaker assembly 1210 via the transmission assembly 1220. The support assembly 1230 may be configured to support the transmission assembly 1220 and/or the speaker assembly 1210, so that the transmission assembly 1220 may contact the user's skin.

In some embodiments, the support assembly 1230 may include a fixing part, which allows the acoustic output device 1200 to be better fixed on the user's body and prevents the acoustic output device 1200 from falling off during use by the user. In some embodiments, the fixing part may have any shape suitable for a part of the human body (e.g., the ear, the head, the neck), such as, a U-shape, a C-shape, a circular ring shape, an ellipse shape, a semicircular shape, etc., so that the acoustic output device 1200 may be independently worn on the user's body. For example, the shape of the fixing part of the support assembly 1230 may match the shape of the human auricle, so that the acoustic output device 1200 may be independently worn on the user's ear. As another example, the shape of the fixing part of the support assembly 1230 may match the shape of a person's head, so that the support assembly 1230 may be hung on the user's head, which can prevent the acoustic output device 1200 from falling off.

In some embodiments, the support assembly 1230 may be a housing structure with a hollow interior. The hollow interior may accommodate a battery assembly, the control circuit assembly, a Bluetooth device, etc., or any combination thereof. In some embodiments, the support assembly 1230 may be made of various materials, such as metal materials (such as aluminum, gold, copper, etc.), alloy materials (such as aluminum alloys, titanium alloys, etc.), plastic materials (such as, polyethylene, polypropylene, epoxy resin, nylon, etc.), fiber materials (such as acetate fiber, propionic acid fiber, carbon fiber, etc.), etc. In some embodiments, the support assembly 1230 may be provided with a sheath. The sheath may be made of a soft material with a certain elasticity, for example, a soft silicone, a rubber, etc., which can provide a better touch feeling for the user.

It should be noted that the above descriptions of the acoustic output device 1200 are intended to illustrate, not limit the scope of the present disclosure. Many alternatives, modifications, and variations may be apparent to those skilled in the art. The features, structures, methods, and other characteristics of the exemplary embodiments described herein may be combined in various ways to obtain additional and/or alternative exemplary embodiments. In some embodiments, the connection between any two assemblies of the acoustic output device 1200 (e.g., the speaker assembly 1210, the transmission assembly 1220, and the support assembly 130) may include bonding, riveting, screwing, integral forming, suction connection, or other similar means, etc., or any combination thereof.

In some embodiments, the acoustic output device 1200 may further include an auxiliary support part, which may be configured to assist in supporting the speaker assembly 1210 by contacting the user. The auxiliary support part may have a rod-like structure, and an end of the auxiliary support part may be directly connected to the speaker assembly 1210. Accordingly, when the user wears the acoustic output device 1200, the auxiliary support part may be in contact with the speaker assembly 1210. Therefore, the speaker assembly 1210 may transmit part of the vibration signal to the user via the auxiliary support part, thereby further enhancing the sound intensity heard by the user.

Figure 13:
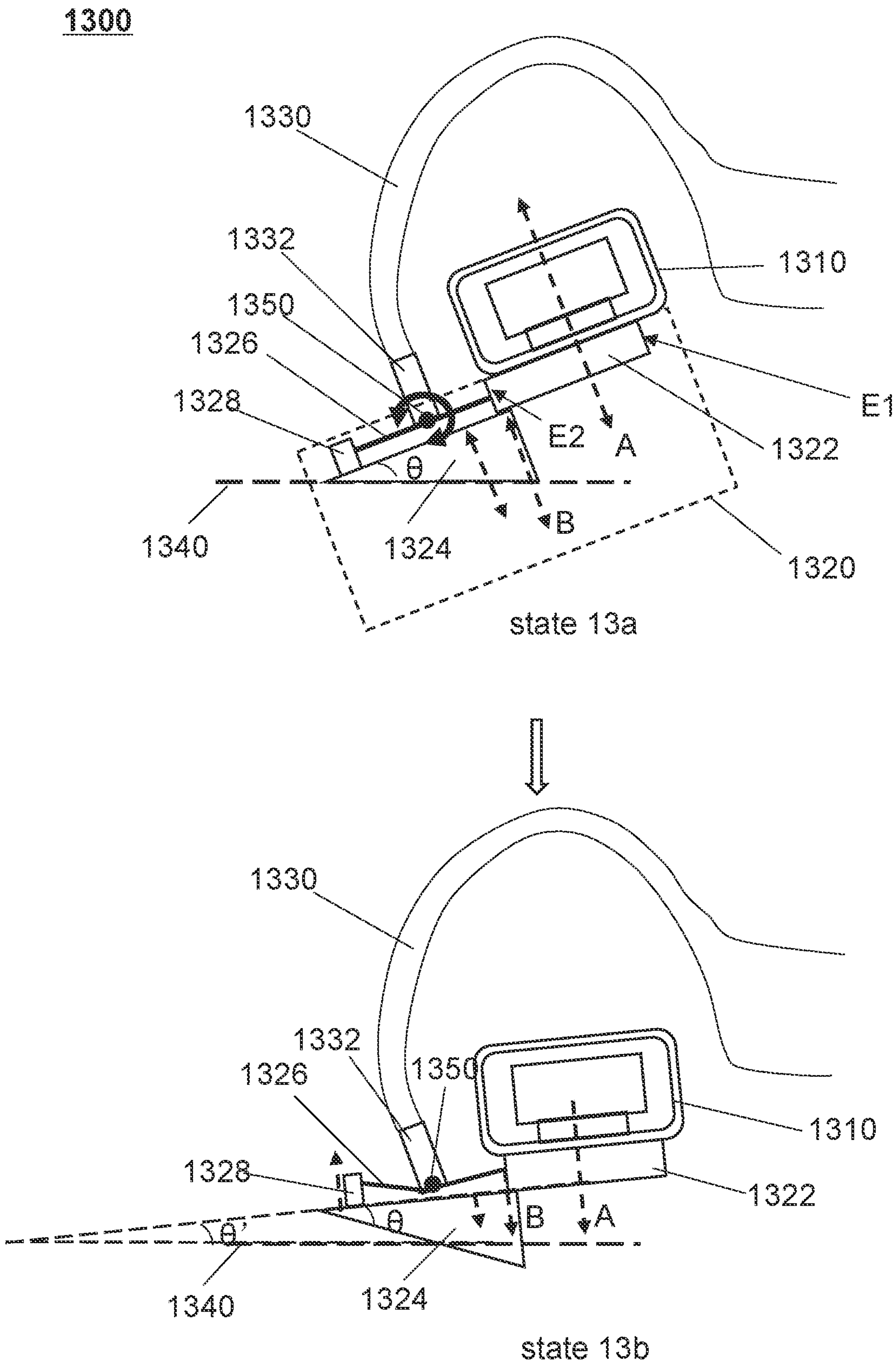
FIG. 13 is a schematic diagram illustrating states related to a process of transmitting a vibration signal to a user by an exemplary acoustic output device according to some embodiments of the present disclosure.

FIG. 13 is a schematic diagram illustrating states related to a process of transmitting a vibration signal to a user by an exemplary acoustic output device according to some embodiments of the present disclosure. As shown in FIG. 13 (e.g., a state 13*a* in FIG. 13), an acoustic output device 1300 may include a speaker assembly 1310, a transmission assembly 1320 (components in the dotted box 1320), and a support assembly 1330.

The speaker assembly 1310 may be connected to the support assembly 1330 via the transmission assembly 1320. The speaker assembly 1310 may generate a vibration signal representing a sound according to an electrical signal. Merely by way of example, the speaker assembly 1310 may include a transducer, a diaphragm, and a housing. The transducer may include a magnetic circuit assembly and a coil. The coil may vibrate in a magnetic field provided by the magnetic circuit assembly, and drive the diaphragm and/or the housing to vibrate. The housing may include a front housing facing a side of the human body and a rear housing opposite to the front housing. The speaker assembly 1310 may provide various resonance peaks. In some embodiments, the speaker assembly 1310 may provide one or more low frequency resonance peaks in a frequency range less than 500 Hz, or in the frequency range less than 800 Hz, or in the frequency range less than 1000 Hz. The low frequency resonance peaks may be related to the elastic modulus of the housing. The lower the elastic modulus of the housing, the lower the low frequency resonance peak of the speaker assembly 1310.

The transmission assembly 1320 may transmit the vibration signal to a user (e.g., the user's cochlea) by contacting the user. In some embodiments, the transmission assembly 1320 may include a connection unit 1322, a vibration transmission plate 1324, and an elastic element 1326. The skin contact area on the transmission assembly 1320 that contacts the user may be provided on the vibration transmission plate 1324.

In some embodiments, the connection unit 1322 may be a structure with two ends (e.g., a first end E1 and a second end E2). For example, the connection unit 1322 may be a rod-like structure a sheet-like structure, etc., having two ends. The speaker assembly 1310 may be connected to the vibration transmission plate 1324 via the connection unit 1322. For example, a side wall (e.g., the lower side wall) of the speaker assembly 1310 may be connected with a side wall (e.g., the upper side wall) of the connection unit 1322. Alternatively, the speaker assembly 1310 may be disposed on the upper side or connected to the first end E1 of the connection unit 1322. For example, as shown in FIG. 13, when the connection unit 1322 is a rectangular rod, the speaker assembly 1310 may be disposed on the upper side wall of the connection unit 1322. For brevity, the upper side of the connection unit 1322 refers to the side of the connection unit 1322 facing away from the user's skin, and the lower side of the connection unit 1322 refers to the side of the connection unit 1322 facing the user's skin. Similarly, the upper side of the speaker assembly 1310 refers to the side of the speaker assembly 1310 facing away from the user's skin, and the lower side of the speaker assembly 1310 refers to the side of the speaker assembly 1310 facing the user's skin. In some embodiments, when the connection unit 1322 is a rod-shaped structure, a cross-section of the rod may be any other shape, such as a rectangle, a triangle, a circle, an ellipse, a regular hexagon, an irregular shape, etc. In some embodiments, when the connection unit 1322 is a sheet-like structure, the shape of the sheet-like structure may include a rectangle, an ellipse, an irregular shape, etc.

The vibration transmission plate 1324 may be connected to the lower side of the connection unit 1322 at the second end E2. The vibration transmission plate 1324 and the skin contact area on the transmission assembly 1320 may be at a distance from the speaker assembly 1310. The vibration transmission plate 1324 may be configured to be in contact with the user (as shown in FIG. 13, the dotted line 1340 may be roughly regarded as the user's skin) to transmit the vibration signal to the user. In some embodiments, the vibration transmission plate 1324 may be a block such as a wedge, which allows or causes the speaker assembly 1310 to be suspended above the user's skin, so that the upper surface or the lower surface of the connection unit 1322 and the user's skin form an angle (e.g., 0 in FIG. 13). In some embodiments, the angle between the upper surface or the lower surface of the connection unit 1322 and the user's skin surface may be in a range from 0 to 90°, or from 0° to 70°, or from 5° to 50°, or from 10° to 50°, or from 10° to 30°, etc. In some embodiments, the angle between the upper surface or the lower surface of the connection unit 1322 and the user's skin surface may further be referred to as an angle between the transmission assembly 1320 and the user's skin 1340 (or the plane on which the user's skin is located).

The elastic element 1326 and the vibration transmission plate 1324 may be located at the same end of the connection unit 1322, that is, the elastic element 1326 may also be connected to the second end E2 of the connection unit 1322. The vibration transmission plate 1324 may be provided with a convex structure 1328 (as shown in FIG. 13). Two ends of the elastic element 1326 may be connected to the convex structure 1328 and the second end E2 of the connection unit 1322, respectively. In some embodiments, the elastic element 1326 may be a sheet-like structure or a rod-like structure with a certain elasticity.

A first end of the support assembly 1330 may be connected to the elastic element 1326 at any point (e.g., a central point) of the elastic element 1326. In some embodiments, the first end of the support assembly 1330 may be connected to the elastic element 1326 directly or through a connection element 1332. For example, the first end of the support assembly 1330 may be connected to the center of the elastic element 1326 directly or through the connection element 1332. When the acoustic output device 1300 is fixedly worn on the user, the support assembly 1330 may be considered to be stationary relative to the user, and in this case, the speaker assembly 1310 may drive the connection unit 1322 and the vibration transmission plate 1324 in response to the vibration signal to rotates about a particular connection point 1350 between the support assembly 1330 and the elastic element 1326.

According to state 13_a_ and state 13_b_ in FIG. 13, the state 13_a_ represents an initial state of the acoustic output device 1300 during a vibration signal transmission process, and the state 13_b_ represents an intermediate state of the acoustic output device 1300 during the vibration signal transmission process. Arrow A indicates a vibration direction of the speaker assembly 1310, and a length of the arrow A indicates a vibration intensity.

When the acoustic output device 1300 is in the initial state (state 13_a_), the angle between the transmission assembly 1320 and the user's skin 1340 is 0, a contact area between the vibration transmission plate 1324 and the user's skin 1340 is the greatest during the vibration signal transmission process. When the acoustic output device 1300 is in the intermediate state (state 13_b_), the angle between the transmission assembly 1320 and the user's skin 1340 may be smaller than the angle between the transmission assembly 1320 and the user's skin 1340 in the initial state of the acoustic output device 1300. Accordingly, the contact area between the transmission assembly 1320 and the user's skin 1340 may change in response to the vibration signal. For example, during a process that the speaker assembly 1310 vibrates around the particular connection point 1350 towards the user's skin 1340, the angle between the transmission assembly 1320 and the user's skin 1340 may gradually decrease (i.e., $\theta'<\theta$ in the state 13_b_). In this case, in the intermediate state of the acoustic output device 1300, the contact area between the vibration transmission plate 1324 and the user's skin 1340 may be smaller than the contact area between the vibration transmission plate 1324 and the user's skin 1340 in the initial state of the acoustic output device 1300. Therefore, during the process that the speaker assembly 1310 transmitting the vibration signal to the user, the vibration sensation of the user may be reduced.

In addition, since the vibration transmission plate 1324 is at a certain distance from the speaker assembly 1310, and the distance between the vibration transmission plate 1324 and the specific connection point 1350 is smaller than the distance between the speaker assembly 1310 and the specific connection point 1350, during the vibration signal transmission process, the vibration intensity of the vibration transmission plate 1324 may be smaller than the vibration intensity of speaker assembly 1310, thereby further reducing the vibration sensation of the user. Merely by way of example, arrow B indicates the vibration at a certain point on the skin contact area, and the length of arrow B indicates the vibration intensity at that point. Since a vertical distance from the specific connection point 1350 to the arrow B is smaller than the vertical distance from the specific connection point 1350 to the arrow A, the vibration intensity of arrow A (i.e., the length of arrow A) may be greater than the intensity of vibration of arrow B (i.e., the length of arrow B).

Therefore, by using the transmission assembly 1320, the vibration originating from the speaker assembly 1310 may be reduced, thereby protecting the user from an uncomfortable vibration sensation in a low frequency range. On this basis, a frequency response of the speaker assembly 1310 may be more flexibly designed to meet different requirements. For example, the lowest resonance peak of the speaker assembly 1310 may be shifted to a lower frequency range to provide richer low frequency signals to the user. As described above, the lowest resonance peak of the speaker assembly 1310 may be adjusted by changing the elastic modulus of the housing of the speaker assembly 1310. In some embodiments, the elastic modulus of the housing of the speaker assembly 1310 may be designed so that the lowest resonance peak of the speaker assembly 1310 may be less than 2500 Hz, or less than 2000 Hz, or less than 1500 Hz, or less than 1200 Hz, or less than 1000 Hz, or less than 800 Hz, or less than 500 Hz, or less than 300 Hz, or less than 200 Hz, or less than 100 Hz, or less than 90 Hz, or less than 50 Hz.

It should be noted that the above description is for the purpose of illustration only, and is not intended to limit the scope of the present disclosure. Various changes and modifications may be made by those skilled in the art under the teaching of the present disclosure. However, these changes and modifications do not depart from the scope of the present disclosure. For example, the speaker assembly 1310 may be directly connected to the vibration transmission plate 1324, that is, the connection unit 1322 may be omitted. In this case, the elastic element 1326 may be directly connected to the speaker assembly 1310. As another example, the acoustic output device 1300 may further include one or more additional components, such as an auxiliary support assembly (not shown). As another example, the skin contact area of the transmission assembly 1320 may be disposed in a region around the ear so that the surface of the speaker assembly 1310 may face the user's ear canal for a better transmission of the air conduction sound wave to the ear.

Figure 14:
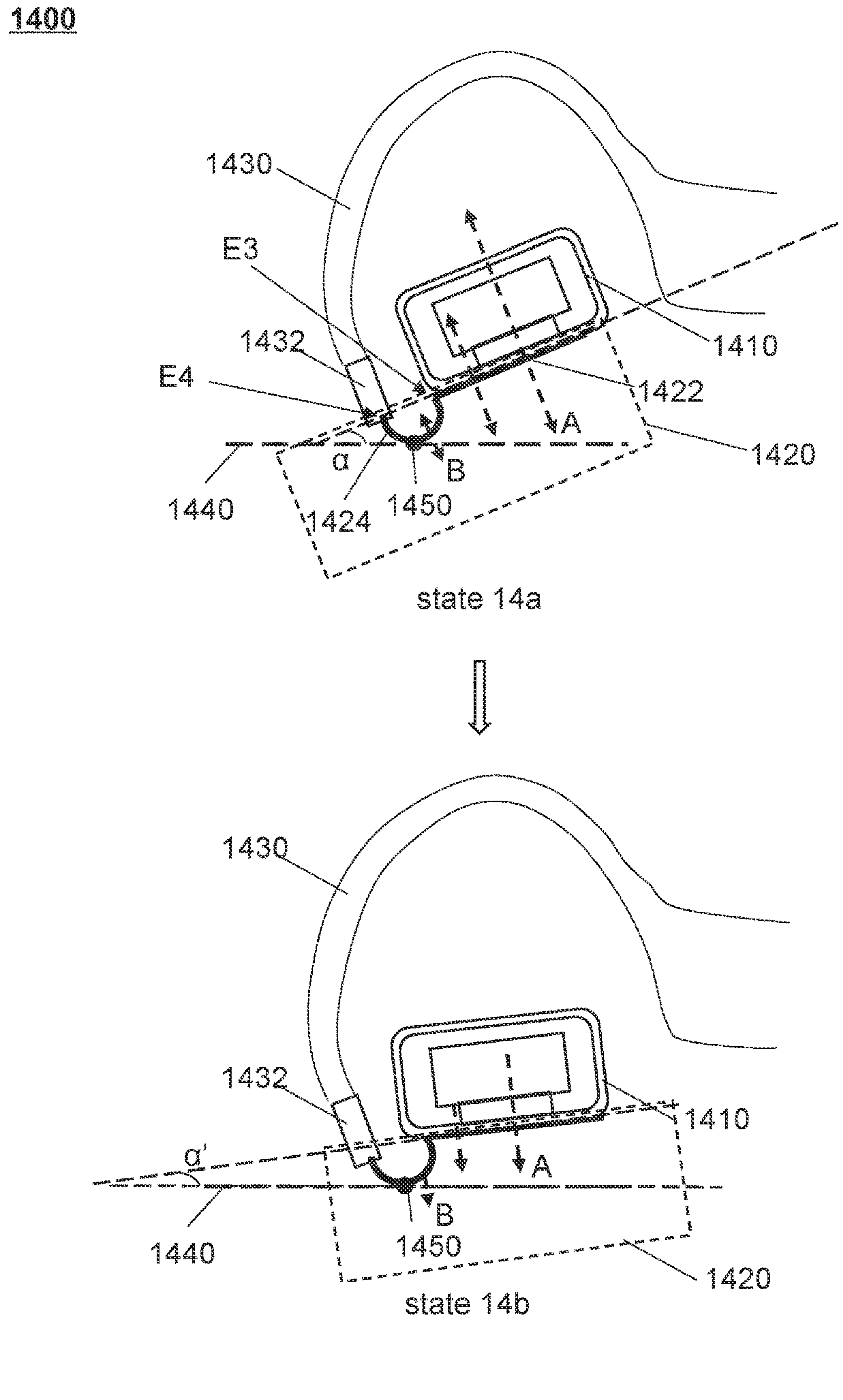
FIG. 14 is a schematic diagram illustrating states related to a process of transmitting a vibration signal to a user by an exemplary acoustic output device according to some embodiments of the present disclosure.

FIG. 14 is a schematic diagram illustrating states related to a process of transmitting a vibration signal to a user by an exemplary acoustic output device according to some embodiments of the present disclosure. As shown in FIG. 14, an acoustic output device 1400 may be similar to the acoustic output device 1300 shown in FIG. 13. The acoustic output device 1400 may include a speaker assembly 1410, a transmission assembly 1420, and a support assembly 1430. The speaker assembly 1410 may be connected to support assembly 1430 via the transmission assembly 1420. The speaker assembly 1410 may generate a vibration signal representing a sound based on an electrical signal. The speaker assembly 1410 may be similar to or the same as the speaker assembly 1310 shown in FIG. 13.

The transmission assembly 1420 may include an elastic element. The elastic element may include a connection part 1422 and an arc structure 1424, and a first end of the connection part 1422 is connected to a first end E3 of the arc structure 1424. In some embodiments, the elastic element (e.g., the connection part 1422 and/or the arc structure 1424) may be made of various elastic materials, such as metal materials (e.g., aluminum, gold, copper, etc.), alloy materials (e.g., aluminum alloy, titanium alloy, etc.), plastic materials (e.g., polyethylene, polypropylene, epoxy resin, nylon, etc.), fiber materials (e.g., acetate fiber, propionic acid fiber, carbon fiber, etc.), etc.

The speaker assembly 1410 may be physically connected to the connection part 1422. For example, when the connection part 1422 is a sheet structure, the speaker assembly 1410 may be disposed on an upper surface of the connection part 1422. As another example, when the connection part 1422 is a rod-shaped structure, the speaker assembly 1410 may be disposed on the upper surface of the connection part 1422, or a sidewall of the speaker assembly 1410 may be connected to a second end of the connection part 1422.

A convex part of the arc structure 1424 may be configured to contact the user's skin 1440, so the speaker assembly

1410 may transmit the vibration signal to the user through the transmission assembly 1420. In this case, a contact area between the arc structure 1424 and the user's skin 1440 may be smaller than the area of the skin contact area of the transmission assembly 1320 shown in FIG. 13. The contact area between the transmission assembly 1420 and the user's skin 1440 may be almost constant in response to the vibration signal. The speaker assembly 1410 may be hung on the user's skin, and may form an angle between the connection part 1422 and the surface of user's skin 1440 (e.g., angle α in state 14*a* of FIG. 14). In some embodiments, the angle between the connection part 1422 and the surface of the user's skin 1440 may be in a range from 0 to 90°, or from 0° to 70°, or from 5° to 50°, or from 10° to 50°, or from 10° to 30°, etc. In some embodiments, the angle between the connection part 1422 and the surface of the user's skin 1440 may further be referred to as the angle between the transmission assembly 1420 and the user's skin 1440 (or the plane on which the user's skin is located).

In some embodiments, the convex part of the arc structure 1424 that contacts the user's skin 1440 may further be referred to as a skin contact area 1450 of the transmission assembly 1420. The skin contact area 1450 on the transmission assembly 1420 may be at a distance from the speaker assembly 1410. A second end E4 of the arc structure 1424 may be connected to one end of the support assembly 1430. When the acoustic output device 1400 is fixedly worn by the user, the support assembly 1430 may be considered to be stationary relative to the user, and in this case, the speaker assembly 1410 may drive the transmission assembly 1420 in response to the vibration signal (i.e., the connection part 1422 and the arc structure 1424 of the elastic element) to vibrate or rotate around the skin contact area 1450. In some embodiments, the second end E4 of the arc structure 1424 may be connected to the support assembly 1430 via a connection element 1432.

According to the state 14*a* and the state 14*b* in FIG. 14, the state 14*a* represents an initial state of the acoustic output device 1400 during the vibration signal transmission process, and the state 14*b* represents an intermediate state of the acoustic output device 1400 during the vibration signal transmission process. Arrow A indicates the vibration direction of the speaker assembly 1410, and a length of the arrow A indicates a vibration intensity.

During the vibration signal transmission process, since the contact area between the arc structure 1424 and the user's skin 1440 is very small, and the vibration signal generated by the speaker assembly 1410 is partially converted into an elastic deformation of the transmission assembly 1420 (e.g., the connection part 1422 and/or the arc structure 1424), compared with the vibration sensation when the speaker assembly 1410 directly contact the user's skin, the vibration sensation may be further reduced.

In addition, since the skin contact area 1450 is at a certain distance from the speaker assembly 1410, the vibration intensity of the skin contact area 1450 may be smaller than the vibration intensity of the speaker assembly 1410 during the vibration signal transmission process, thereby further reducing the user's vibration sensation. Merely by way of example, the arrow B represents the vibration at a point near the skin contact area 1450, and the length of arrow B represents the vibration intensity at that point. As a vertical distance from the skin contact area 1450 to the arrow B is smaller than a vertical distance from the skin contact area 1450 to the arrow A, the vibration intensity of arrow A (i.e., the length of arrow A) may be greater than the vibration intensity of arrow B (i.e., the length of arrow B).

Therefore, by using the transmission assembly 1420, the vibration originating from the speaker assembly 1410 may be reduced, thereby protecting the user from an uncomfortable vibration sensation in a low frequency range. Based on this, the frequency response of the speaker assembly 1410 may be more flexibly designed to meet different requirements. For example, the lowest resonance peak of speaker assembly 1410 may be shifted to a lower frequency range to provide richer low frequency signals to the user. As described above, the lowest resonance peak of the speaker assembly 1410 may be adjusted by changing the elastic modulus of the housing of the speaker assembly 1410. In some embodiments, the elastic modulus of the housing of the speaker assembly 1410 may be designed so that the lowest resonance peak of the speaker assembly 1410 may be less than 2500 Hz, or less than 2000 Hz, or less than 1500 Hz, or less than 1200 Hz, or less than 1000 Hz, or less than 800 Hz, or less than 500 Hz, or less than 300 Hz, or less than 200 Hz, or less than 100 Hz, or less than 90 Hz, or less than 50 Hz.

For illustration purposes only, only one elastic element is described in the acoustic output device 1400. However, it should be noted that the acoustic output device 1400 in the present disclosure may further include a plurality of elastic elements, so the vibration signal may further be jointly delivered by the plurality of elastic elements. In some embodiments, the elastic elements may include a plurality of arc structures, so the vibration signal may further be jointly transmitted by the plurality of arc structures. For example, the plurality of arc structures may be arranged side by side.

It should be noted that the above description is for the purpose of illustration only, and is not intended to limit the scope of the present disclosure. Various changes and modifications may be made by those skilled in the art under the teaching of the present disclosure. However, these changes and modifications do not depart from the scope of the present disclosure. For example, the arc structure 1424 may be directly connected to speaker assembly 1410, i.e., the connection part 1422 may be omitted. As another example, the acoustic output device 1400 may further include one or more additional components, such as an auxiliary support component (not shown). As another example, the skin contact area 1450 of the transmission assembly 1420 may be disposed in a region around the ear so that the surface of the speaker assembly 1410 may face the user's ear canal to better transmit the air conduction sound wave to the ear.

Figure 15:
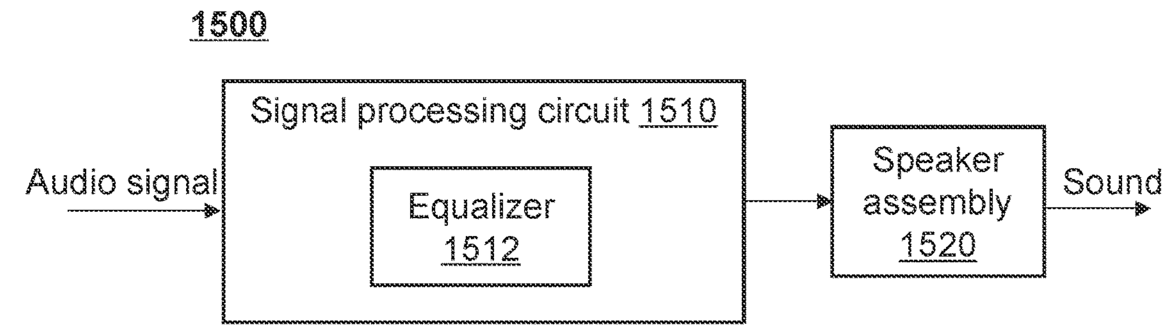
FIG. 15 is a schematic diagram illustrating an exemplary acoustic output device according to some embodiments of the present disclosure.

FIG. 15 is a schematic diagram illustrating an exemplary acoustic output device according to some embodiments of the present disclosure. As shown in FIG. 15, an acoustic output device 1500 may include a signal processing circuit 1510 and a speaker assembly 1520. The signal processing circuit 1510 may be electrically connected with the speaker assembly 1520.

The signal processing circuit 1510 may receive an audio signal (e.g., an electrical signal) from an audio signal source and process the audio signal to obtain a target audio signal. The target audio signal may drive the speaker assembly 1520 to produce a sound. For example, the signal processing circuit 1510 may receive the audio signal from devices such as a mobile phone, an MP3 player, and a microphone through a wired connection and/or a wireless connection. The signal processing circuit 1510 may perform, for example, one or more signal processing operations such as decoding, sampling, digitization, compression, frequency division, frequency modulation, equalization, gain adjustment, encoding, etc., on the received audio signal. The signal processing circuit 1510 may transmit the processed target audio signal to the speaker assembly 1520. In some embodiments, the signal processing circuit may be integrated on the control circuit (e.g., the control circuit 140 in FIG. 1).

The speaker assembly 1520 may receive the target audio signal and convert it into sound (e.g., an air conduction sound wave, a bone conduction sound wave). Merely by way of example, the speaker assembly 1520 may include a transducer, a diaphragm, and a housing. The transducer may be electrically connected to the signal processing circuit 1510 to receive the target audio signal. The transducer may convert the target audio signal into a mechanical vibration signal. The diaphragm may be driven by the transducer to vibrate and generate the air conduction sound wave. In some embodiments, the transducer may be connected to the housing. The housing may include a skin contact area. The skin contact area may be driven by the transducer to vibrate and generate the bone conduction sound wave. More descriptions of the speaker assembly may be found elsewhere in the present disclosure (e.g., FIG. 2A and its descriptions).

Based on the foregoing, due to the interaction between a chamber (e.g., a second chamber) in the speaker assembly 1520 and a sound outlet, the air conduction sound wave output by the speaker assembly 1520 (or the acoustic output device 1500) has a first resonance peak on its frequency response curve. At the frequency position of the first resonance peak, the output air conduction sound generated in the chamber increases sharply, so that the air conduction sound output by the speaker assembly 1520 (or the acoustic output device 1500) and a sound leakage generated thereof suddenly increases in a frequency band near the frequency corresponding to the first resonance peak, which causes the sound quality of the acoustic output device 1500 to be unbalanced and the sound leakage increase. To this end, the signal processing circuit 1510 may be configured to weaken a signal amplitude of the corresponding frequency band, thereby reducing the output of the sound in this frequency band, and weakening a phenomenon of the sudden sound increase, thereby improving the sound quality and avoiding the sound leakage of the acoustic output device 1500.

Exemplarily, the signal processing circuit 1510 may include at least one equalizer (EQ) 1512 for implementing the signal equalization. Specifically, a signal gain coefficient of the equalizer 1512 for a first frequency band of the audio signal may be greater than a signal gain coefficient of the equalizer 1512 for a second frequency band, and the second frequency band is higher than the first frequency band. In some embodiments, the first frequency band may at least include 500 Hz. The second frequency band may at least include 3.5 kHz or 4.5 kHz. In some embodiments, the first resonance peak may be shifted to the high frequency as much as possible. For example, the peak resonant frequency of the first resonance peak may be set to be within the second frequency band or higher than the second frequency band. In this way, the equalizer 1512 may be configured to weaken the signal amplitude, thereby reducing the signal output of the second frequency band, weakening the sudden increase of the air conduction sound, and thus making the high frequency of the sound quality of the acoustic output device 1500 more balanced.

In some embodiments, the equalizer 1512 may include one or more filters. The filter(s) may include an analog filter, a digital filter, etc. or combinations thereof. In some embodiments, the equalizer 1512 may include a wavelet filter, an average sliding filter, a median filter, an adaptive median filter, etc., or any combination thereof. In some embodiments, in order to suppress a sudden increase of the sound leakage at the resonant frequency band, the equalizer 1512 may include a digital bandpass filter. A center frequency of the digital bandpass filter may be close to the peak frequency of the first resonance peak, for example, a frequency difference between the two may be within one octave. A quality factor Q of the digital bandpass filter may range between 0.5-6. A digital bandpass filter gain may be controlled within a range of 0-12 dB.

In some embodiments, the signal processing circuit 1510 may further include a volume monitoring module. The volume monitoring module may monitor the volume of the acoustic output device 1500. The equalizer 1512 may set different signal gain coefficients for the first frequency band according to the volume of the acoustic output device 1500. More descriptions about the volume monitoring module may be found elsewhere in the present disclosure (e.g., FIG. 16 and its descriptions).

In some embodiments, the higher the volume, the smaller the signal gain coefficient of the first frequency band. For example, in the case of low volume, the equalizer may make the low-frequency signal gain coefficient greater, so that the listening feeling at the low-frequency is sufficient, full, and the sound quality is better; while in the case of high volume, the equalizer may make the low-frequency signal gain coefficient smaller, thereby avoiding a broken sound caused by the excessive amplitude of the speaker.

Figure 16:
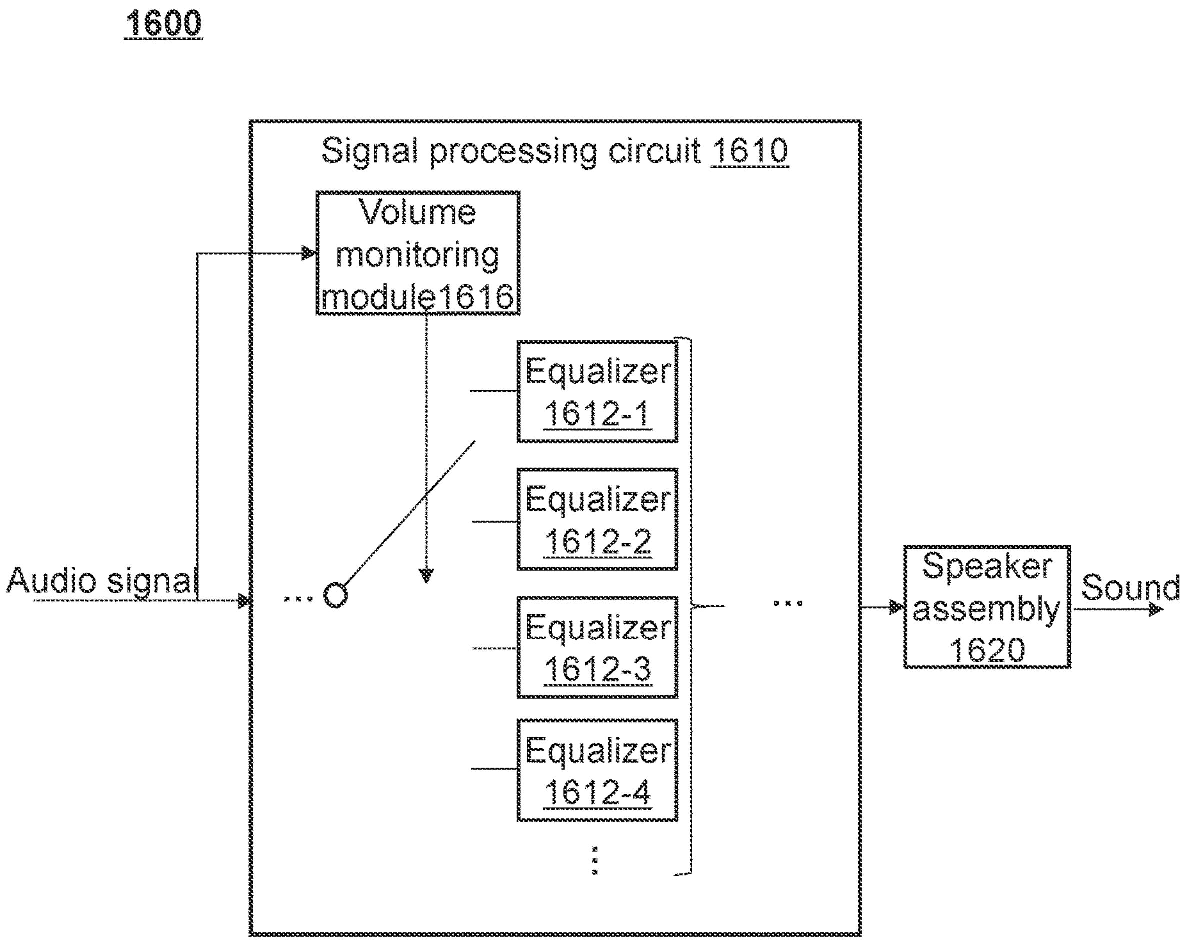
FIG. 16 is a schematic diagram illustrating an exemplary acoustic output device according to some embodiments of the present disclosure.

FIG. 16 is a schematic diagram illustrating an exemplary acoustic output device according to some embodiments of the present disclosure. As shown in FIG. 16, an acoustic output device 1600 may be similar to the acoustic output device 1500 shown in FIG. 15. For example, the acoustic output device 1600 may include a signal processing circuit 1610 and a speaker assembly 1620. As another example, the signal processing circuit 1610 may include an equalizer. More descriptions of the equalizer may be found elsewhere in the present disclosure (e.g., FIG. 15 and its descriptions).

The signal processing circuit 1610 may include two or more equalizers (e.g., an equalizer 1612-1, an equalizer 1612-2, an equalizer 1612-3, an equalizer 1612-4, etc.). Each equalizer may have different equalization parameters. In other words, each equalizer equalizes the same signal differently. For example, a signal gain coefficient of the equalizer 1612-1 for the 200 Hz-500 Hz frequency band in an audio signal may be greater than its signal gain coefficient for the 2 kHz-3 kHz frequency band. As another example, the signal gain coefficient of the equalizer 1612-2 for the 400 Hz-1 KHz frequency band in the audio signal may be greater than its signal gain coefficient for the 3 kHz-4.5 kHz frequency band.

The signal processing circuit 1610 may further include a volume monitoring module 1616. When the signal processing circuit 1610 receives the audio signal from an audio signal source (e.g., a mobile phone), the volume monitoring module 1616 may combine the audio signal and the volume setting of the acoustic output device 1600 to determine a volume state of the acoustic output device 1600. In some embodiments, each volume state of the acoustic output device 1600 may correspond to an equalizer. The signal processing circuit 1610 may select the corresponding equalizer according to the volume state of the acoustic output device 1600 to perform an equalization processing on the audio signal. For example, when the volume is low, an equalizer with more low frequencies (that is, with a greater gain coefficient for the low frequency signal) may be called, so that the listening feeling at the low-frequency is sufficient, full, and the sound quality is better. As another example, when the volume is high, an equalizer with less frequency may be called to limit the amplitude of the speaker assembly 1620 so that it does not cause a broken sound or a poor vibration experience.

In some embodiments, when the volume monitoring module 1616 cannot monitor the volume state of the acoustic output device 1600, a default equalizer may be configured as the equalizer corresponding to the audio signal to perform the equalization processing and update the audio signal. The volume monitoring module 1616 may determine the volume state of the acoustic output device 1600 again according to the updated audio signal until the volume state of the acoustic output device 1600 is a known volume state. The signal processing circuit 1610 may select the corresponding equalizer to perform the equalization processing according to the known volume state.

It should be noted that the above description of the acoustic output device is intended to illustrate, not limit the scope of the present disclosure. Many alternatives, modifications and variations will be apparent to those skilled in the art. The features, structures, methods, and other characteristics of the exemplary embodiments described herein may be combined in various ways to obtain additional and/or alternative exemplary embodiments. For example, the acoustic output device 1600 may further include a waterproof liner to improve the waterproof and dustproof performance of the acoustic output device 1600. As another example, when the user wears the acoustic output device 1600, the speaker assembly 1620 may be arranged obliquely on the user's skin.

The basic concepts have been described above, and obviously, for those skilled in the art, the above disclosure of the invention is only an example, and does not constitute a limitation to the present disclosure. Although not expressly stated here, various modifications, improvements, and amendments to the present disclosure may be made by those skilled in the art. Such modifications, improvements, and amendments are suggested in the present disclosure, so such modifications, improvements, and amendments still belong to the spirit and scope of the exemplary embodiments of the present disclosure.

Meanwhile, the present disclosure uses specific words to describe the embodiments of the present disclosure. For example, "one embodiment," "an embodiment" and/or "some embodiments" means a certain feature, structure or characteristic related to at least one embodiment of the present disclosure. Therefore, it should be emphasized and noted that two or more references to "an embodiment" or "one embodiment" or "an alternative embodiment" in different places in the present disclosure do not necessarily refer to the same embodiment. Further, certain features, structures, or characteristics of one or more embodiments of the present disclosure may be properly combined.

In addition, those skilled in the art will understand that various aspects of the present disclosure may be illustrated and described in several patentable categories or circumstances, including any new and useful process, machine, product or combination of substances or combinations thereof or any new and useful improvements. Correspondingly, various aspects of the present disclosure may be entirely executed by hardware, may be entirely executed by software (including firmware, resident software, microcode, etc.), or may be executed by a combination of hardware and software. The above hardware or software may be referred to as "block," "module," "engine," "unit," "assembly" or "system". Additionally, aspects of the present disclosure may be embodied as a computer product comprising computer readable program code on one or more computer readable media.

In addition, unless explicitly stated in the claims, the order in which elements and sequences are processed, the use of numbers and letters, or the use of other designations in the present disclosure is not intended to limit the order of the flows and methods thereof. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the system assemblies described above may be implemented by hardware devices, they may also be implemented by a software-only solution, such as installing the described system on an existing server or mobile device.

In the same way, it should be noted that in order to simplify the expression disclosed in the present disclosure and help the understanding of one or more embodiments of the present disclosure, in the foregoing description of the embodiments of the present disclosure, sometimes multiple features are combined into one embodiment, drawings or descriptions thereof. This method of disclosure does not, however, imply that the subject matter of the application requires more features than are recited in the claims. Rather, the claimed subject matter may lie in less than all features of a single foregoing disclosed embodiment.

In some embodiments, numbers describing the quantity of assemblies and attributes are used. It should be understood that such numbers used in the description of the embodiments use the modifiers "about," "approximately" or "substantially" in some examples to retouch. Unless otherwise stated, the "about," "approximately" or "substantially" indicates that the stated number allows for a variation of +20%. Accordingly, in some embodiments, the numerical parameters used in the present disclosure and the claims are approximations that can vary depending upon the desired characteristics of individual embodiments. In some embodiments, the numerical parameters should consider the specified significant digits and adopt the general digit reservation method. Although the numerical ranges and parameters used in some embodiments of the present disclosure to confirm the breadth of the scope are approximate values, in specific embodiments, such numerical values are set as precisely as practicable.

The entire contents of each patent, patent application, patent application publication, and other material, such as article, book, specification, publication, document, etc., cited in the present disclosure are hereby incorporated by reference into the present disclosure. Application history documents that are inconsistent with or conflict with the content of the present disclosure are excluded, and documents (currently or later appended to the present disclosure) that limit the broadest scope of the claims of the present disclosure are excluded. It should be noted that if there is any inconsistency or conflict between the descriptions, definitions, and/or terms used in the accompanying materials of the present disclosure and the contents thereof, the descriptions, definitions and/or terms used in the present disclosure shall prevail.

Finally, it should be understood that the embodiments described in the present disclosure are only used to illustrate the principles of the embodiments of the present disclosure.

Other deformations may also belong to the scope of the present disclosure. Therefore, by way of example and not limitation, alternative configurations of the embodiments of the present disclosure may be considered consistent with the teachings of the present disclosure. Accordingly, the embodiments of the present disclosure are not limited to the embodiments explicitly introduced and described in the present disclosure.

What is claimed is:

1. An acoustic output device including a speaker assembly, the speaker assembly comprising:

a transducer;

a diaphragm, the diaphragm being driven by the transducer to vibrate to generate an air conduction sound wave; and a housing, the housing forming an accommodating chamber for accommodating the transducer and the diaphragm, wherein the diaphragm separates the accommodating chamber to form a first chamber and a second chamber, the housing is provided with a sound outlet communicating with the second chamber, and the air conduction sound wave is transmitted to the outside of the acoustic output device through the sound outlet, wherein the housing is provided with a sound guiding channel communicating with the sound outlet for guiding the air conduction sound wave to a target direction outside the acoustic output device, and a length of the sound guiding channel is less than or equal to 7 mm; and the housing includes a skin contact area, and the skin contact area is driven by the transducer to vibrate and generate a bone conduction sound wave, when the acoustic output device is in a wearing state, a first area of the skin contact area is in contact with a user's skin to vibrate and generate the bone conduction sound wave, and a second area of the skin contact area is not in contact with the user's skin, the first area and the second area are joined by an arc surface, and an angle between the second area and the user's skin is in a range of 2°-40°.

2. The acoustic output device of claim 1, wherein a cross-sectional area of the sound guiding channel increases gradually along a transmission direction of the air conduction sound wave.

3. The acoustic output device of claim 2, wherein the cross-sectional area of an inlet end of the sound guiding channel is greater than or equal to 10 $mm^2$ or the cross-sectional area of an outlet end of the sound guiding channel is greater than or equal to 15 $mm^2$.

4. The acoustic output device of claim 1, wherein a ratio of a volume of the sound guiding channel to a volume of the second chamber is in a range of 0.05-0.9.

5. The acoustic output device of claim 4, wherein the volume of the second chamber is less than or equal to 400 $mm^3$.

6. The acoustic output device of claim 1, wherein a channel wall of the sound guiding channel includes a curved surface structure.

7. The acoustic output device of claim 1, wherein the transducer comprises:

a magnetic circuit assembly configured to provide a magnetic field;

a coil configured to vibrate under an action of the magnetic field in response to a received audio signal; and a coil support configured to support the coil, at least a part of the coil support being exposed laterally from the housing in a direction perpendicular to a vibration direction of the housing;

the acoustic output device further comprises:

a sound conduction component that includes the sound guiding channel and a depressed region, and when the sound conduction component is physically connected to the housing, the coil support is located in the depressed region.

8. The acoustic output device of claim 1, wherein the air conduction sound wave output through the sound outlet has a first resonance peak, and the acoustic output device further comprises:

a Helmholtz resonator, the Helmholtz resonator including a resonator body and at least one resonator opening for weakening the first resonance peak of the air conduction acoustic wave.

9. The acoustic output device of claim 8, wherein the at least one resonator opening is provided on a side wall of the second chamber.

10. The acoustic output device of claim 9, wherein a difference between a peak resonance intensity of the first resonance peak when the at least one resonator opening is in an open state and the peak resonance intensity of the first resonance peak when the at least one resonator opening is in a closed state is greater than or equal to 3 dB.

11. The acoustic output device of claim 8, wherein the Helmholtz resonator communicates with the first chamber and the second chamber simultaneously, and an area of the at least one resonator opening communicating with the first chamber is greater than or equal to an area of the at least one resonator opening communicating with the second chamber.

12. The acoustic output device of claim 1, wherein the housing includes a first housing and a second housing, the first housing constitutes at least a part of the first chamber and has a first resonant frequency, the second housing constitutes at least a part of the second chamber and has a second resonant frequency, and the first resonant frequency is lower than the second resonant frequency.

13. The acoustic output device of claim 12, wherein the second resonant frequency is less than or equal to 2 kHz.

14. The acoustic output device of claim 12, wherein:

when a vibration frequency of the first housing is between 20 Hz and 150 Hz, a phase difference between the second housing and the first housing is between $-\pi/3$ and $+\pi/3$; and when the vibration frequency of the first housing is between 2 kHz and 4 kHz, the phase difference between the second housing and the first housing is between $2\pi/3$ and $4\pi/3$.

15. The acoustic output device of claim 1, further comprising:

a support assembly, one end of the support assembly being connected to the housing to support the speaker assembly, wherein the second area is farther away from the support assembly than the first area.

16. The acoustic output device of claim 1, further comprising:

a signal processing circuit configured to convert an audio signal into a driving signal of the transducer, wherein the signal processing circuit has a greater signal gain coefficient for a first frequency band than for a second frequency band of the audio signal, and the second frequency band is higher than the first frequency band.

17. The acoustic output device of claim 16, wherein the first frequency band includes at least 500 Hz, and the second frequency band includes at least 3.5 kHz or 4.5 kHz.

18. The acoustic output device of claim 16, wherein the air conduction sound wave output through the sound outlet has a first resonance peak, and a peak resonant frequency of the first resonance peak is within the second frequency band, or higher than the second frequency band.

* * * * *